(12) United States Patent　　(10) Patent No.: US 7,962,425 B1
Oakenfull　　(45) Date of Patent: Jun. 14, 2011

(54) METHOD AND SYSTEM FOR RESPONDING TO AN ALERT

(75) Inventor: Ian Edward Oakenfull, Queensland (AU)

(73) Assignee: International Business Machines Corporation, Amonk, NY (US)

( * ) Notice: Subject to any disclaimer, the term of this patent is extended or adjusted under 35 U.S.C. 154(b) by 0 days.

(21) Appl. No.: 12/952,716

(22) Filed: Nov. 23, 2010

Related U.S. Application Data

(63) Continuation of application No. 12/497,818, filed on Jul. 6, 2009, now abandoned.

(51) Int. Cl.
　　*G06E 1/00*　　(2006.01)
　　*G06E 3/00*　　(2006.01)
　　*G06F 15/00*　　(2006.01)
　　*G06F 15/16*　　(2006.01)
　　*G06F 15/177*　　(2006.01)
　　*G06F 15/76*　　(2006.01)
　　*G06G 7/00*　　(2006.01)
　　*G06N 99/00*　　(2010.01)
(52) U.S. Cl. ............. 706/10; 709/202; 709/220; 712/28
(58) Field of Classification Search .................... None
　　See application file for complete search history.

(56) References Cited

U.S. PATENT DOCUMENTS

| | | | |
|---|---|---|---|
| 6,598,124 | B1 | 7/2003 | Damron et al. |
| 7,343,222 | B2 | 3/2008 | Solomon |
| 7,461,130 | B1 * | 12/2008 | AbdelAziz et al. ............ 709/208 |
| 7,594,015 | B2 * | 9/2009 | Bozak et al. .................. 709/226 |
| 2005/0160424 | A1 * | 7/2005 | Broussard et al. ................ 718/1 |
| 2008/0027591 | A1 | 1/2008 | Lenser et al. |
| 2008/0133052 | A1 | 6/2008 | Jones et al. |

OTHER PUBLICATIONS

Grnarov, Aksenti et al.; "Grid Computing Implementation in Ad Hoc Networks"; 2008; Springer Science; Advances in Computer and Information Sciences and Engineering; pp. 196-201.*

Wang, Zhi et al.; "Wireless Grid Computing over Mobile Ad-Hoc Networks with Mobil Agent"; 2005; Proceedings of the First Inernational Conference on Semantics, Knowledge, and Grid (SKG 2005); 3 pages.*

U.S. Appl. No. 12/494,497, filed Jun. 30, 2009; First Named Inventor Ian Edward Oakenfull; Confirmation No. 1236; Expressly Abandoned Nov. 19, 2010. Notice of Abanonment Nov. 23, 2010.

U.S. Appl. No. 12/497,818, filed Jul. 6, 2009; First Named Inventor Ian Edward Oakenfull; Confirmation No. 7280; Expressly Abandoned Nov. 24, 2010. Notice of Abanonment Nov. 29, 2010.

(Continued)

*Primary Examiner* — Donald Sparks
*Assistant Examiner* — Stanley K Hill
(74) *Attorney, Agent, or Firm* — Schmeiser, Olsen & Watts; John Pivnichny

(57) ABSTRACT

A method and system for responding to an alert pertaining to an event. A unique processor of a first micro grid apparatus of at least one micro grid apparatus detects an alert data packet that includes the alert. Each micro grid apparatus includes at least two processors that contain a unique processor. Each processor of each micro grid apparatus has its own operating system. The unique processor of each micro grid apparatus has a unique operating system. Each unique processor selects at least one processor from each micro grid apparatus. Each selected processor is designated as a macro grid processor of a respective macro grid by altering the operating system of each selected processor. An artificial intelligence is generated for each macro grid. The event is responded to and quenched by implementing the artificial intelligence of each macro grid, after which each macro grid is extinguished.

25 Claims, 23 Drawing Sheets

OTHER PUBLICATIONS

U.S. Appl. No. 12/541,205, filed Aug. 14, 2009; First Named Inventor Ian Edward Oakenfull; Confirmation No. 2876; Expressly Abandoned Dec. 13, 2010. Notice of Abanonment Dec. 16, 2010.

U.S. Appl. No. 12/609,057, filed Oct. 30, 2009; First Named Inventor Ian Edward Oakenfull; Confirmation No. 7660; Expressly Abandoned Jan. 21, 2011. Notice of Abanonment Jan. 24, 2011.

U.S. Appl. No. 12/699,128, filed Feb. 3, 2010; First Named Inventor Ian Edward Oakenfull; Confirmation No. 5321.

U.S. Appl. No. 12/699,177, Filing Date Feb. 3, 2010; First Named Inventor Ian Edward Oakenfull; Confirmation No. 5429.

U.S. Appl. No. 12/949,059, Filing Date Nov. 18, 2010; First Named Inventor Ian Edward Oakenfull; Confirmation No. 5101.

U.S. Appl. No. 12/963,777, Filing Date Dec. 9, 2010; First Named Inventor Ian Edward Oakenfull; Confirmation No. 3557.

U.S. Appl. No. 13/010,123, Filing Date Jan. 20, 2011; First Named Inventor Ian Edward Oakenfull; Confirmation No. 2099.

Ortiz et al.; Autonomous Collaborative Agents in Wireless Environments; SRI Presentations and Demos; SRI International; Department of the Navy Science & Technology; 23 pages.

Pravin Varaiya; Intelligent Autonomous Agents: Convergence of Communications, Networking, Adaptive Control, and Real-time Distributed Computing; University of California, Berkeley; pp. 0-22.

Anonymous: "Blade server"; Wikipedia; Jul. 3, 2009; pp. 1-6; XP002601339. [online]. Retrieved from the Internet: <URL: http://en.wikipedia.org/w/index.php2title=Blade_server&oldid=300051901 . [retrieved on Sep. 20, 2010].

Smith et al.; "Towards a Service-Oriented Ad Hoc Grid"; Parallel and Distributed Computing, 2004. Third International Symposium on/Algorithms, Models and Tools for Parallel Computing on Heterogeneous Networks, 2004. Third International Workshop on Cork, Ireland Jul 5-7, 2004, Piscataway, NJ, USA, IEEE, Jul. 5, 2004. Pages 201-208.

Expressly Abandoned Mar. 14, 2011—U.S. Appl. No. 12/699,128, filed Feb. 3, 2010; First Named Inventor Ian Edward Oakenfull; Confirmation No. 5321.

U.S. Appl. No. 13/045,654, filed Mar. 15, 2011; First Named Inventor Ian Edward Oakenfull; Confirmation No. 3341.

Expressly Abandoned Mar. 16, 2011—U.S. Appl. No. 12/699,177, filed Feb. 3, 2010; First Named Inventor Ian Edward Oakenfull; Confirmation No. 5429.

U.S. Appl. No. 13/048,158, filed Mar. 15, 2011; First Named Inventor Ian Edward Oakenfull; Confirmation No. 8166.

* cited by examiner

METHOD AND SYSTEM FOR RESPONDING TO AN ALERT

This application is a continuation application claiming priority to Ser. No. 12/497,818, filed Jul. 6, 2009 and now abandoned.

FIELD OF THE INVENTION

The present invention relates to a method and system for responding to an alert.

BACKGROUND OF THE INVENTION

Alarms, beeps, whistles, and alerts commonly prevail. People are surrounded by gadgets that warn of everything, from a kettle whistle, a microwave oven beep, a cell phone melody, a washing machine chime, an intruder siren, a door bell, a reversing truck horn, an airplane seat-belt gong, a radar detector buzzer, a target discriminators squeal, an inter-planetary probes micro-wave data burst, a tsunami sensors sonar, a global warming CO2 transponder, etc. The world is becoming domestically, commercially, and militarily swamped by alerts.

Unfortunately, current technology does not provide responses to alerts that utilize resources efficiently.

Thus, there is a need for an apparatus and method that provides responses to alerts that utilize resources efficiently.

SUMMARY OF THE INVENTION

The present invention provides a method for responding to an alert pertaining to an event, said method comprising:

a unique processor of a first micro grid apparatus of at least one micro grid apparatus detecting an alert data packet comprising the alert, each micro grid apparatus comprising a plurality of processors that include a unique processor, each processor of each micro grid apparatus having its own operating system, the unique processor of each micro grid apparatus having a unique operating system that differs from the operating system of each other processor of each micro grid apparatus;

after said detecting the alert data packet, each unique processor selecting at least one processor from each micro grid apparatus;

designating each selected processor as a macro grid processor of a respective macro grid by altering an operating system of each selected processor to a macro grid operating system and by assigning to each selected processor a responsibility for operation of its respective macro grid;

generating an artificial intelligence for each macro grid;

responding to and quenching the event by implementing the artificial intelligence of each macro grid; and after said quenching the event, extinguishing each macro grid.

The present invention provides a system for responding to an alert pertaining to an event, said system comprising:

at least one micro grid apparatus, each micro grid apparatus comprising a plurality of processors that include a unique processor, each processor of each micro grid apparatus having its own operating system, the unique processor of each micro grid apparatus having a unique operating system that differs from the operating system of each other processor of each micro grid apparatus, said at least one micro grid apparatus configured to perform a method, said method comprising:

a unique processor of a first micro grid apparatus of the at least one micro grid apparatus detecting an alert data packet comprising the alert;

after said detecting the alert data packet, each unique processor selecting at least one processor from each micro grid apparatus;

designating each selected processor as a macro grid processor of a respective macro grid by altering an operating system of each selected processor to a macro grid operating system and by assigning to each selected processor a responsibility for operation of its respective macro grid;

generating an artificial intelligence for each macro grid;

responding to and quenching the event by implementing the artificial intelligence of each macro grid; and after said quenching the event, extinguishing each macro grid.

The present invention provides a process for supporting computer infrastructure, said process comprising providing at least one support service for creating, integrating, hosting, maintaining, and/or deploying computer-readable code in a data processing system, wherein the code in combination with the data processing system is configured to perform a method for responding to an alert pertaining to an event, said method comprising:

a unique processor of a first micro grid apparatus of at least one micro grid apparatus detecting an alert data packet comprising the alert, each micro grid apparatus comprising a plurality of processors that include a unique processor, each processor of each micro grid apparatus having its own operating system, the unique processor of each micro grid apparatus having a unique operating system that differs from the operating system of each other processor of each micro grid apparatus;

after said detecting the alert data packet, each unique processor selecting at least one processor from each micro grid apparatus;

designating each selected processor as a macro grid processor of a respective macro grid by altering an operating system of each selected processor to a macro grid operating system and by assigning to each selected processor a responsibility for operation of its respective macro grid;

generating an artificial intelligence for each macro grid;

responding to and quenching the event by implementing the artificial intelligence of each macro grid; and after said quenching the event, extinguishing each macro grid.

The present invention advantageously provides an apparatus and method that provides responses to alerts that utilize resources efficiently.

DETAILED DESCRIPTION OF THE INVENTION

The present invention relates generally to grid computing, and more particularly to micro grid and macro grid processing, the functional system purpose, the system structure, and method of system use of the same, that provides for the functionality of a micro grid, additional data buses necessary to interface to a micro grid and macro grid, and each of the system elements' functional relationship with, wireless macro grid alerts under artificial intelligence control. Existing application software, operational system software, communications software, and other software including drivers, interpreters and compilers for micro processor systems can function within embodiments of the present invention.

Figure 1:
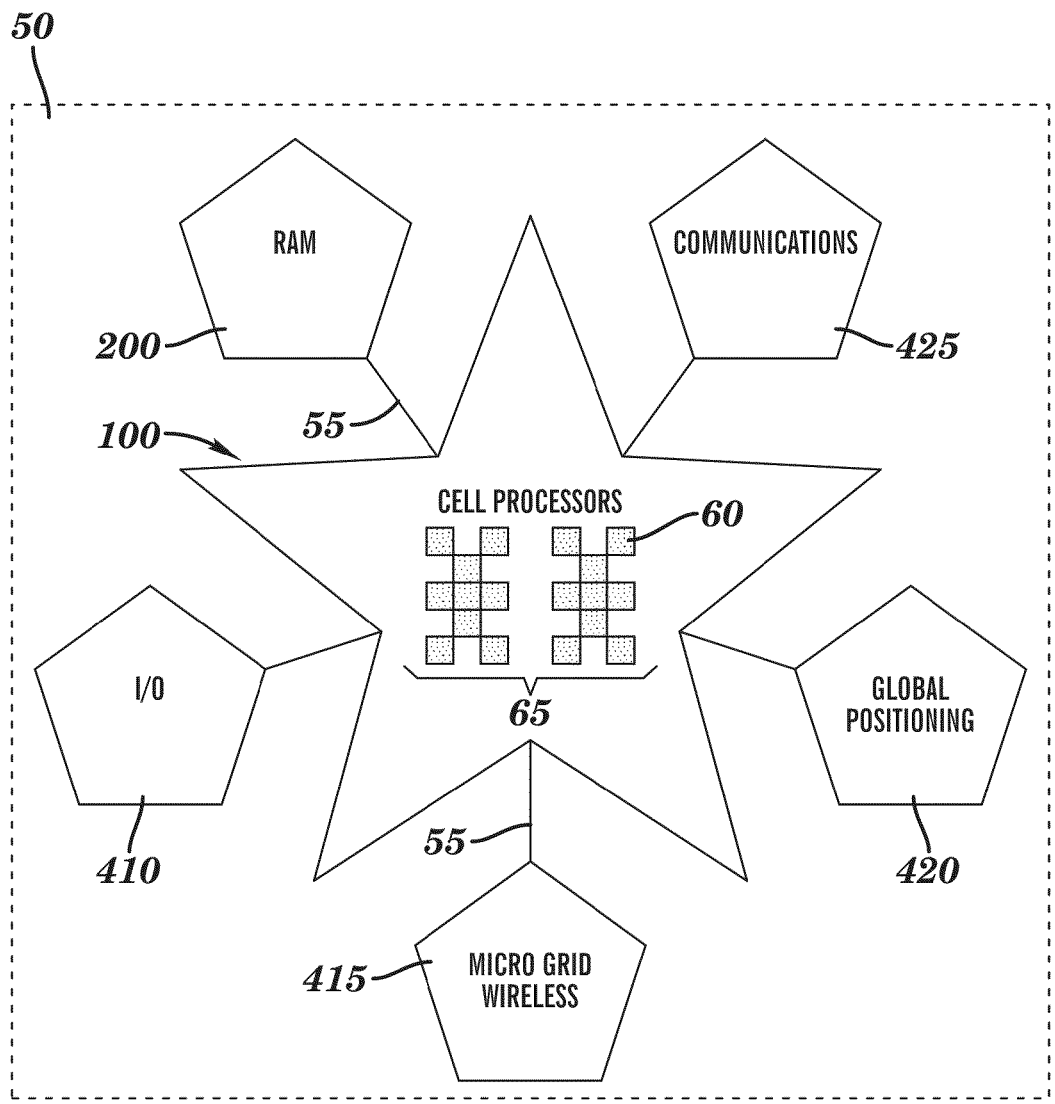
FIG. 1 is a block diagram of a computer system comprising a micro grid apparatus and irregular shaped modules connected to the micro grid apparatus via respective connection interfaces, in accordance with embodiments of the present invention.

FIG. 1 is a block diagram of a computer system 50 comprising a micro grid apparatus 100 and irregular shaped modules 200, 410, 415, 420, and 425 connected to the micro grid apparatus 100 via respective connection interfaces 55, in accordance with embodiments of the present invention. The micro grid apparatus 100 is also called a "complex shape".

The micro grid apparatus 100 is configured to enable the irregular shaped modules 200, 410, 415, 420, and 425 to be geometrically connected thereto via the respective connection interfaces 55. The connection interfaces 55 accommodate a V-shaped geometric connection between the irregular shaped modules 200, 410, 415, 420, and 425 and the complex shape of the micro grid apparatus 100.

Figure 2A:
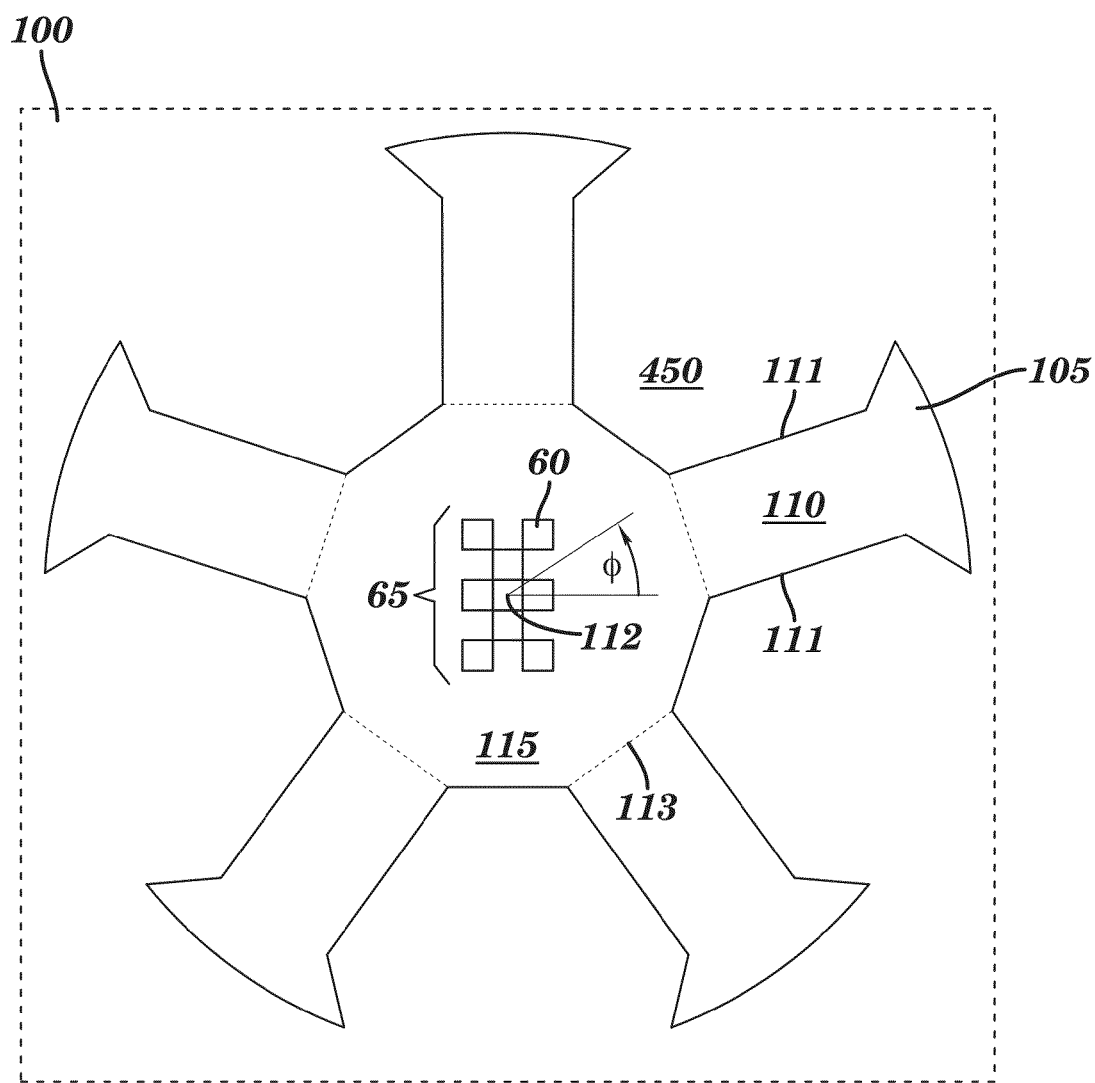
FIG. 2A is a diagram depicting the micro grid apparatus of FIG. 1, in accordance with embodiments of the present invention.

The micro grid apparatus 100 comprises a central area 115 (see FIG. 2A) that includes a micro grid, wherein the micro grid comprises a plurality of processors 65. In one embodiment, each processor of the plurality of processors 65 has a unique Internet Protocol (IP) address. The reference numeral "65" refers to the collection of processors that the plurality of processors consists of. In embodiments of the present invention, the plurality of processors 65 consists of nine or eighteen individual processors. In practice, the number of processors may be determined by design criteria, manufacturing considerations, etc. In FIG. 2A, a central area 115 of the micro grid apparatus 100 having a complex shape comprises a plurality of processors 65 consisting of nine processors with connection to a micro grid wireless module of irregular shape 415 and four other types of add-on hardware interface modules of the irregular shaped modules 200, 410, 420, and 425 (see FIG. 1) accommodated in the five docking bays 450. The central area 115 comprises a plurality of processors 65 that are linked together wirelessly or by direct electrical connection, and the plurality of processors 65 are linked wirelessly or by direct electrical connection to each irregular shaped module.

Each processor of the plurality of processors 65 has its own individual operating system and assigned resources (e.g., cache memory—not shown). The operating system within each processor of the micro grid apparatus 100 controls the programmatic housekeeping and individual processor availability and assignment of the micro grid, including allocation of random access memory of irregular shape 200 to the processors with common types of operating systems within the micro grid apparatus 100, and other communication interfaces of irregular shape 425. The processors within the apparatus 100 are linked by multiple data buses (not shown) for data transfer and electrical connection to each other where they collectively reside with their individual cache memory and cache controllers in the same physical apparatus. Contemporaneously, there are multiple operating systems actively functioning in the different processors of the same physical micro grid apparatus 100.

An assembled micro grid apparatus structure of the present invention is constructed from two physically different components: (1) the complex shape of the micro grid apparatus 100, which may embody the central processing unit's cell wafer including the associated cache memory, the cache controllers, and the associated electronic circuits of the micro grid apparatus 100; and (2) the closely packed modular irregular shaped modules (e.g., 200, 410, 415, 420, 425 for which there are five docking bays provided).

In FIG. 1, the five different irregular shaped modules, which may be selected and assembled for functional use by the micro grid apparatus 100, include: (1) the irregular shape

200 which embodies random access memory (RAM); (2) the irregular shape 425 which embodies communications comprising Transmission Control Protocol/Internet Protocol (TCP/IP) Ethernet, cable, and/or fiber optic communications; (3) the irregular shape 420 which embodies a Global Positioning System (GPS); (4) the irregular shape 415 which embodies micro grid wireless connection points (e.g., 18×802.11s micro grid wireless connection points); and (5) the irregular shape 410 which embodies input and output (I/O) support including data buffers for serial and parallel linked peripheral components and devices.

The irregular shaped modules 200, 410, 415, 420, and 425 are interchangeable and fit any docking bay in the micro grid apparatus 100 as determined by system architectural design. Different combinations, including multiples of one type of irregular shape, are permitted in an assembled apparatus. For example, three RAM modules 200, a micro grid wireless module 415, and a global positioning module 420 would facilitate a mobile micro grid apparatus 100 with a particularly large amount of memory; however it would not have I/O, or physical connectable communication functionality. Each irregular module is coupled by high speed bi-directional data buses available at the connection interface (e.g., 'V' shaped connection interface) 55. The total number of such data buses is equal to the total number of processors of the plurality of processors. For example, if the total number of such processors is 18, then the total number of such data buses is 18. The processors of the plurality of processors 65 contained in the complex shape of the micro grid apparatus 100 communicate individually via each of the available individual data buses (e.g., of 18 data buses) to the irregular shaped module 415, connected by the 'V' shaped connection interface 55.

Figure 8:
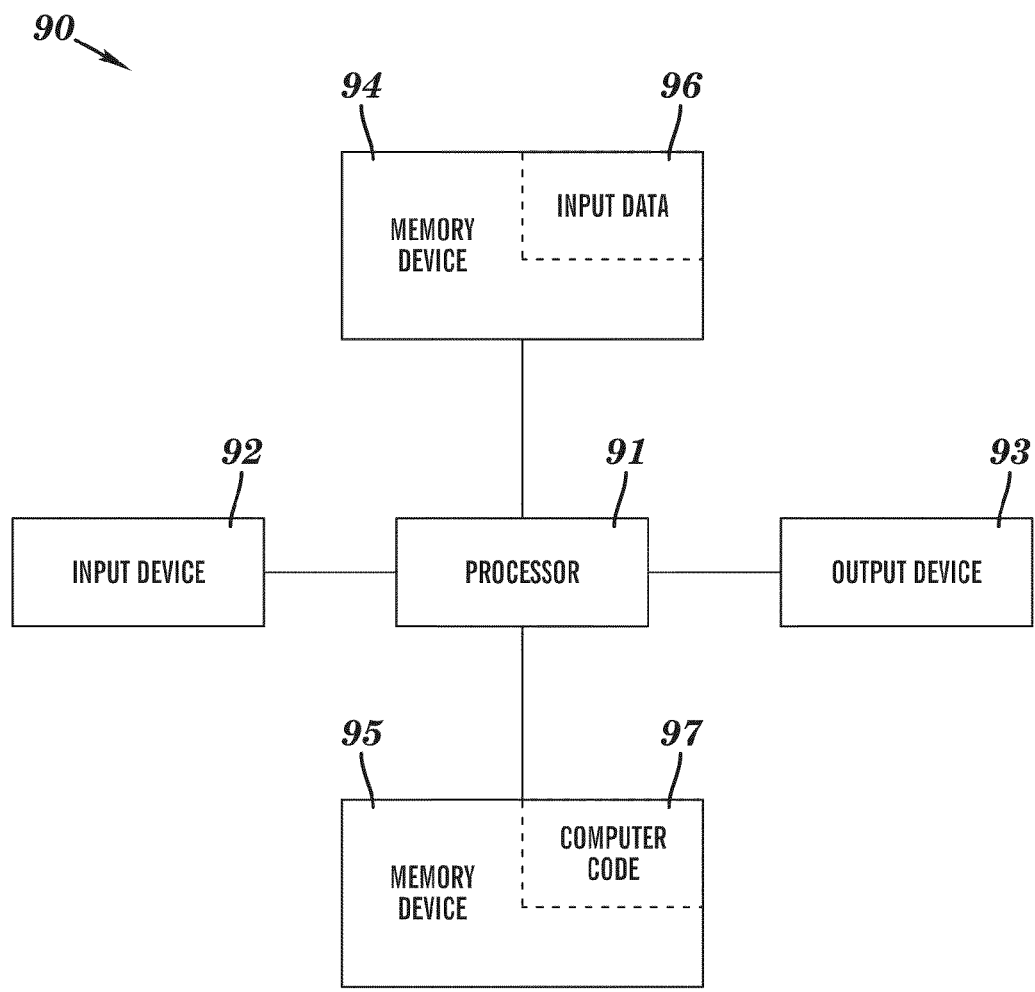
FIG. 8 illustrates an exemplary data processing apparatus used for implementing any process or functionality of any processor used in accordance with embodiments of the present invention.

The plurality of processors 65 includes a unique processor 60 having its unique operating system and is included among the associated micro grid of processors 65, and may include associated internal cache memory and cache memory control, main random access memory 200 for storing data and instructions while running application programs, a mass-data-storage device, such as a disk drive for more permanent storage of data and instructions, peripheral components such as monitors, keyboard, pointing devices, sensors and actuators which connect to the I/O module 410, data and control buses for coupling the unique processor 60 and its operating system to the micro grid processors and components of the computer system, and a connection bus 55 for coupling the micro grid processors and components of the computer system. FIG. 8, described infra, depicts an exemplary data processing apparatus in which any processor of the present invention may function.

The present invention utilizes one or more operating systems residing in single processors, and multiple operating systems residing in multiple processors, such as may be embodied on the same wafer, can be constructed with known software design tools and manufacturing methods.

The computer system 50 provides the following functionalities:

1. Containment of the micro grid apparatus 100 and its I/O capability for detecting local alerts and peripheral device interfacing with I/O module 410, its communications capability for receiving alerts via communications module 425, its global positioning system module 420 for detecting location and change of location when mobile, its multiple wireless communications ability for data interchange via the micro grid wireless module 415, and its system memory storage via RAM module 200, embodied in a single apparatus incorporating a single complex shape, and coupled to selectable and interchangeable modules of irregular shape (e.g., module 415) is provided for.
2. Enablement to heat dissipation of the complex shape of the micro grid apparatus 100 is provided for by two surfaces being available without obstruction by connection pins. Thus in one embodiment, no connection pins are connected to either or both of a top surface and a bottom surfaces of the central area 115. This physical method of forming the apparatus doubles the available surface area for heat dissipation capability and enhances known heat dissipation techniques for micro processors. The underside connection pins of the complex shape may be provided only on the radial arms to functionally facilitate dual heat dissipation contact devices on the top and underside of the complex shape. Thus in one embodiment, connection pins are connected to a bottom surface of at least one radial arm of the radial arms 110 and not to a top surface any radial arm 110. A suitable hole in the mountable multi-layered printed circuit board under the complex shape will accommodate the underside heat dissipation device.
3. Enablement of modularity in micro computer structural design of the computer system 50 is provided by selecting all or any multiple combinations of available irregular shaped modules (e.g., 200, 410, 415, 420, and/or 425) and other 'interconnecting modules'. The method of the present invention forms a modular design with flexibility that provides for generalized micro grid functionality, as well as specialized micro grid functionality, and provides customized design functionality for larger and more complex grid computing systems constructed from a plurality of interconnected micro grids.
4. Enablement of scaleable designs of the micro grid apparatus (by use and interconnection of multiple complex shapes) is provided for grid computing.
5. Enablement of micro grid hardware design change and working system reconfiguration of a micro grid's functionality is provided. Irregular shaped modules (e.g., 200, 410, 415, 420, and/or 425) can be mechanically extracted from the complex shape and other irregular shaped modules selected and mechanically inserted in the resultant vacant docking bay as a design change preference to alter the micro grid functional design. A change of the irregular shaped modules 200, 410, 415, 420, and/or 425 provides for system software diversity by reconfiguration for a micro grid's functionality.
6. Enablement of robotic micro grid maintenance and remote design change is provided. The irregular shaped modules are designed for ease of extraction and replacement. This feature enhances techniques for microprocessor maintenance by system engineers and facilitates robotic intervention for hardware fault elimination of irregular shaped modules in remote or dangerous locations (e.g., spacecraft probes in unfavorable atmospheres).
7. Enablement of dynamic change of the operating system software functioning in each micro grid processor, by instruction from the unique processor 60, to function within the embodiment of a single apparatus as a macro grid processor with it's assigned micro grid processors, independently generated and wirelessly connected. The macro grid processor connects wirelessly the wireless module 415 to other adjacent macro grid processors forming a macro grid across which a transient and mobile artificial intelligence resides.

FIG. 2A is a diagram depicting the micro grid apparatus 100 of FIG. 1, in accordance with embodiments of the present invention. The micro grid apparatus 100 comprises a central area 115 and five radial arms 110, wherein the radial arms 110 are external to and integral with the central area 115. A micro grid apparatus generally comprises a plurality of radial arms. For example, the number of radial arms may consist of 2, 3, 4, 5, 6, 7, 8, 9, 10, 11, 12, etc. or at least 2, 3, 4, 5, 6, 7, 8, 9, 10, 11, 12, etc. The central area 115 of the micro grid apparatus 100 provides hardware containment of a basic micro grid of 9 processors 65 each with its own operating system. The unique processor 60 has a unique operating system that differs from the operating system of each of the other processors. The unique processor 60 governs all other processors of the plurality of processors 65. The docking bays 450 are defined by adjacent radial arms 110 and accommodate irregular shaped modules such as irregular shaped modules 200, 410, 415, 420, and/or 425 discussed supra in conjunction with FIG. 1.

The processors are linked to each other via a system bus (not shown), a micro grid bus (not shown) and a macro grid bus (not shown). Known existing (and future designed) application software, operational system software, communications software, and other software including drivers, interpreters and compilers for micro processor systems may function within the embodiments of the present invention. Any irregular shaped module is able to connect to any of the five docking bays available in the complex ceramic chip structure in any combination, including the arrangement of five bridge modules attached to one complex ceramic chip structure. In one embodiment, Terrestrial and 802.11g Wireless Communication protocols and standards may be employed for use in the present invention. In one embodiment, the Mesh Wireless Communication 802.11s standard may be employed for use in the present invention. Circumstances (e.g., manufacturing, research, etc.) determine standards (e.g., 802.11g, 802.11s, and other existing wireless standards and future standards) that may be used in different embodiments or in different combinations in the same embodiment (e.g., inclusion of communication techniques such as 'Bluetooth').

In one embodiment, the outer curved edge 105 of the radial arm 110 is physically manufactured to the shape of a circle, resulting in the outer curved edge 105 of the radial arms 110 being at a radial distance (e.g., of 5 cm in this example) from a radial center 112 of the circle (i.e., the circle has a diameter of 10 cm in this example) within the central area 115 of the micro grid apparatus 100. Each radial arm 110 extends radially outward from the central area 115 and has an outer curved edge 105 disposed at a constant radial distance from the radial center 112. Thus, the outer curved edges 105 of the radial arms 110 collectively define a shape of a circle centered at the constant radial distance from the radial center 112. The circle has a diameter exceeding a maximum linear dimension of the central area 115. Each pair of adjacent radial arms 110 defines at least one docking bay 450 into which an irregular shaped module can be inserted. The total number of docking bays 450 is equal to the total number of radial arms 110. In one embodiment, one or more irregular shaped modules are inserted into respective docking bays 450 defined by adjacent radial arms 110. In one embodiment, the radial arms 110 are uniformly distributed in azimuthal angle φ about the radial center 112. In one embodiment, the radial arms 110 are non-uniformly distributed in azimuthal angle φ about the radial center 112, which may be employed to accommodate different sized irregular shaped modules with corresponding radial arms 110 that present different sizes and shapes of their 'V' interface.

The central area 115 of the micro grid apparatus 100 comprises a plurality of processors 65 that are electrically linked together and are electrically linked to each irregular shaped module that is inserted into a respective docking bay 450 defined by adjacent radial arms 110. The central area 115 has a polygonal shape (i.e., a shape of a polygon 113) whose number of sides is twice the number of radial arms 110. The dashed lines of the polygon 113 do not represent physical structure but are shown to clarify the polygonal shape of the polygon 113. In FIG. 2A, the polygon 113 has 10 sides which corresponds to the 5 radial arms 110. The polygon of the polygonal shape of the micro grid apparatus 100 may be a regular polygon (i.e., the sides of the polygon have the same length and the internal angles of the polygon are equal to each other) or an irregular polygon (i.e., not a regular polygon). The radial arms 110 may be uniformly distributed in azimuthal angle φ about the radial center 112. The radial arms 110 being uniformly distributed in azimuthal angle φ about the radial center 112 is a necessary but not sufficient condition for the polygon of the polygonal shape of the micro grid apparatus 100 to be a regular polygon. Accordingly, the radial arms 110 may be uniformly distributed in azimuthal angle φ about the radial center 112 such that the polygon is not a regular polygon. In one embodiment, the radial arms 110 are non-uniformly distributed in azimuthal angle φ about the radial center 112.

The central area 115 is structurally devoid of connection pins on the top and underside surfaces, enabling direct contact with heat dissipation devices on both surfaces. The radial arms 110 have connection pins on the underside (i.e., bottom) surface.

Five docking bays 450 for the irregular shaped modules (200, 410, 415, 420, 425) are provided between the radial arms 110. Each radial arm 110 has parallel sides 111 oriented in a radial direction and are 1.4 cm wide in this example. The arc at the outer curved edge 105 of the radial arm 110 has a chord of 2.7 cm in this example.

The connection interface 55 provides an electrical connection 'V' point for a system bus between the complex structure and the irregular shaped modules and is available along the edge of the docking bay 450 of the pentagonal shape of the central area 115 of the complex shape. The bus comprises individual bi-directional data buses (e.g., 18 data buses) capable of connecting the micro grid processors (e.g., 18 processors) with their own operating systems to their own individual wireless devices contained in the irregular shaped module 415 for micro grid wireless connection points. The mechanical connection is achieved by the irregular shaped module 415 press fitting its wedged connection point edge into a 'V' edged protrusion along the length of the complex shape; i.e., the docking bay's pentagonal edge.

Figure 2B:
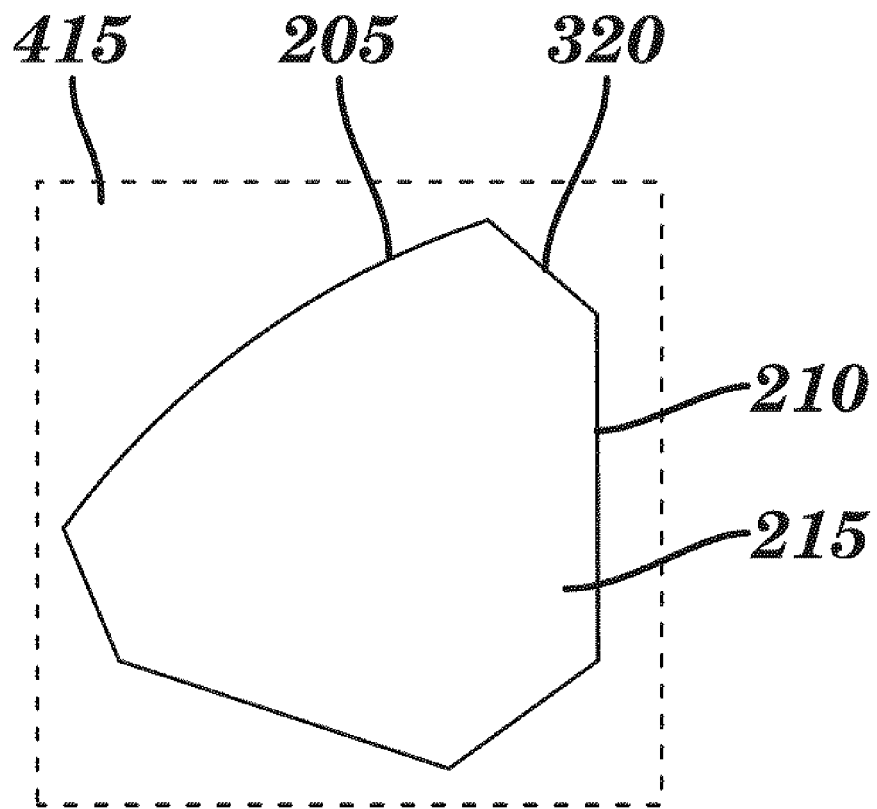
FIG. 2B is a diagram showing an irregular shaped module, in accordance with embodiments of the present invention.

FIG. 2B is a diagram showing an irregular shaped module 415, in accordance with embodiments of the present invention. The irregular shaped module 415 in FIG. 2B may alternatively be any other irregular shaped module such as the irregular shaped module 200, 410, 420, or 425. The irregular shaped module in FIG. 2B contains chip structure to provide hardware containment of the micro grid wireless interfaces and is latched into place with downward pressure on the curved edge 205 within the embrace of the docking bay after their electrical connection 'V' shaped receptacle edge has been positioned correctly and is in contact with the electrical connections of the complex shape's 'V' protrusion edge. The curved edge 205 in FIG. 2B is analogous to the curved edge 105 in FIG. 2A.

The latching mechanism on the radial arms 110 of the complex shape in FIG. 2A is provided as a raised and rounded protrusion of about 1.5 mm height×about 3.5 mm length along the edge 320 of both sides of the irregular module shape 415 in this example. This protrusion fits a receptacle with the same characteristics to receive the complex shape, on all the radial arm edges of the complex shape. In one embodiment, the irregular shaped modules are manufactured from a slightly softer molded material to provide the mechanical contraction against the harder ceramic form of the complex shaped module, thus enabling the latching mechanism to work. In one embodiment, the manufacturing is configured to create a relatively softer complex shaped module to accept relatively harder irregular shaped modules.

The irregular shapes are manufactured to fit perfectly within the docking bay 450 (see FIG. 2A), with less than 0.1 mm of gap tolerance around the non contact edges in this example. The gap tolerance (0.1 mm or otherwise) is determined by the mechanics of the protrusion and receptacle mechanical latching mechanism described supra. The chord of the curved edge 205 is 3.5 cm and the non-contact side 210 of the irregular shaped module is 2.2 cm in length in this example. Connection pins are not present on the irregular shaped module, and similar to the complex shape, both top surfaces 215 and underside surfaces are available for contact with heat dissipation devices. External system devices such as a disk drive (not shown) for more permanent storage of data and instructions, and peripheral components such as monitors, keyboard, pointing devices, sensors and actuators, connect via the underside pins on the radial arms of the complex shape to the I/O irregular shaped module 410.

Similarly, the global positioning irregular shaped module 420 and the communications irregular shaped module 425 connect to their external associated hardware (i.e., physical antenna, cable and fiber connections) via the underside pins on the radial arms of the complex shape. The RAM irregular shaped module 200) and micro grid wireless module 415 do not necessarily require the use of connection pins under the complex shape as they are self contained and do not have any associated external hardware.

In accordance with the present invention, each individual processor can participate as a member of the micro grid apparatus 100 and may be conscripted for functional use from within the micro grid apparatus 100 by one uniquely assigned processor (e.g., by processor 60) with its individual operating system. Each processor of the plurality of processors 65 has its own individual operating system and assigned resources (e.g., cache memory—not shown) and is available to participate either by direct connection and/or wirelessly (802.11g), either individually and/or collectively, on demand, from within the embodiment of the micro grid apparatus 100 to an external dynamically expanding and contracting wireless macro grid, comprised of conscripted and participating processors, from a plurality of participating micro grids according to embodiments of the present invention. Each processor of common processors within the micro grid apparatus 100 with the same type of individual operating system and assigned resources is available for functional use as a wirelessly connected participant of one or more macro grids.

A macro grid comprises a set of processors conscripted from one or more micro grid apparatuses to become macro grid processors within the macro grid. A macro grid may also include other computational resources which do not function as a macro grid processors, such as other micro grid processors of the one or more micro grid apparatuses.

A macro grid may dynamically change as a function of time. The macro grid has a geographical footprint, which is spatial contour defined by the macro grid processors in a macro grid. The spatial contour of the geographical footprint may be generated by fitting a curve to the geographical locations of the macro grid processors in a macro grid at a given instant of time. The geographical footprint (i.e., the spatial contour) of a macro grid expands or contracts dynamically as macro grid processors are added or removed, respectively, from the macro grid and also as the spatial location of one or more macro grid processors in the macro grid change as a function of time.

Conscripted micro grid processors that are participants in a macro grid could be physically contained within the confines of a moving vehicle, a flying airplane, a sailing ship, a walking person, etc. Thus, the mobility of macro grid processors contributes to dynamic changes in the macro grid.

An artificial intelligence of the present invention is intelligent software implemented by a macro grid (i.e., by the macro grid processors in a macro grid) to perform a task or a set of tasks in real time in response to detection of an alert pertaining to an event (e.g., a risk) The alert may be detected by a unique processor 60 residing in the plurality of processors in the complex shape of the micro grid apparatus 100. In one embodiment, the artificial intelligence (i.e., the intelligent software) of a macro grid is located in a single macro grid processor of the macro grid. In one embodiment, the artificial intelligence is distributed among a plurality of macro grid processors of the macro grid (i.e., different portions of the software comprised by the artificial intelligence are stored in different macro grid processors of the macro grid). In one embodiment, the artificial intelligence is distributed and stored among all of the macro grid processors of the macro grid. The location of the artificial intelligence in the macro grid may be static (i.e., unchanging) or may dynamically change in accordance with a transient evolution of the macro grid as the response to the alert develops over time and eventually reduces and terminates as the specific event associated with the alert diminishes and is quenched. In addition, the mobility macro grid processors of a macro grid may be accompanied by locational changes in the artificial intelligence associated with the macro grid.

The scope of logic, decision making, and any other intelligent functionality in an artificial intelligence of the present invention includes the current state of knowledge, and enablement of that knowledge for practical utilization, known to a person of ordinary skill in the field of artificial intelligence at any time that the present invention is practiced. Thus, it is contemplated that an artificial intelligence of the present invention will be utilized with increasing capabilities and levels of sophistication as corresponding capabilities and levels of sophistication are developed in the field of artificial intelligence.

An artificial intelligence is generated (i.e., created), by hardware and/or software in any manner known to a person of ordinary skill in the field of artificial intelligence. For example, a set of artificial intelligences may pre-exist in a storage medium and a particular stored artificial intelligence that is capable of responding to the event associated with the alert may be activated for use by the macro grid. As another example, an artificial intelligence may generated by software in a manner that tailors the artificial intelligence to the specific event associated with the alert.

The unique processor 60 is used to create and dynamically change macro grids and to create artificial intelligences to govern (i.e., control and manage) operation of the macro grids in response to a real time alert. A software conscription request may be received (or generated) by the unique assigned processor 60 in the micro grid apparatus 100 from (or to) uniquely assigned processors of other micro grids, that are wirelessly adjacent and available, to the alert sensing (or alert transmitting) micro grid apparatus 100. In one embodiment, once an alert is acknowledged by the unique processors in two or more micro grids, a macro grid is formed and expands by further conscription demand of other adjacent wirelessly available micro grids to become a large macro grid, comprised of a plurality of selected numbers of individual processors within a plurality of wirelessly connected micro grids. The macro grid processor connects wirelessly the wireless module 415 to other adjacent macro grid processors forming a macro grid across which a transient and mobile artificial intelligence resides. The dynamically constructed macro grid continues to function wirelessly utilizing changing populations of connected individual processors embodied within micro grids. The macro grid is governed by an artificial intelligence.

The macro grids expand and contract their geographic footprint as: (1) participating micro grid processor numbers increase and decrease; (2) the operating system of the micro grid unique processors re-prioritizes individual processor availability; (3) the physical location of the participating processors change as detected via the global positioning interface module 420; (3) the unique application program alert demand, from within the macro grid, adjusts requirements for micro grid processor participation; and/or (4) new alerts are raised for functional use of micro grid processors that are already engaged in functional use by other macro grids. It is noted that different macro grids can use different processors embodied within the same micro grid apparatus.

An artificial intelligence is generated by the unique processor 60, within the wireless configuration of a macro grid, as a result of a program alert to the operating system of the unique processor 60 within the micro grid apparatus 100, from sensor signals and software activity on the I/O interface of irregular shaped module 410. In response to the alert, the artificial intelligence conscripts available physically connected processors from within the described micro grid apparatus, and wirelessly conscripts available processors from different micro grid apparatus's within a prescribed or otherwise detectable range. The artificial intelligence becomes transient and not specifically reliant on the initiating host unique processor's operating system.

The artificial intelligence governs its macro grid via the operating systems of the unique processors of the participating, wirelessly connected micro grid apparatuses, and authoritatively controls the functionality and sustained vitality of its mobile macro grid that has been initiated for it to reside upon, until expiry or offload. In one embodiment, one macro grid supports one artificial intelligence, and one micro grid may have mutually exclusive individual processors under the control of multiple artificial intelligences.

A plurality of transient artificial intelligences can co-exist (each contained within their individual expanding and contracting macro-grids) contemporaneously. The different artificial intelligences utilize different individual wirelessly connected micro grid processors, their common type operating systems, and their assigned resources, available within any single micro grid apparatus.

Figure 2C:
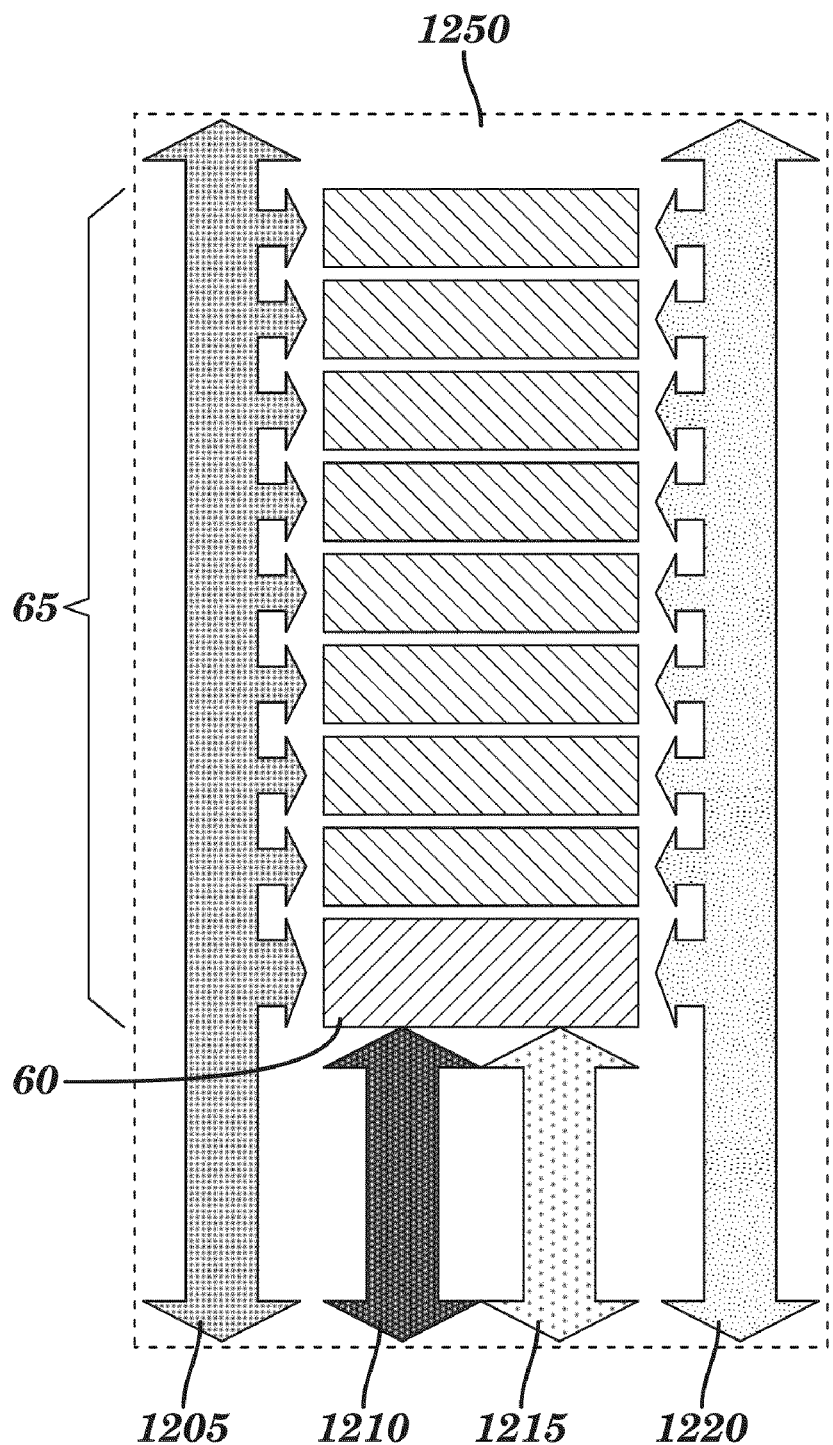
FIG. 2C depicts a micro grid system stack, in accordance with embodiments of the present invention.

FIG. 2C depicts a micro grid system stack 1250, in accordance with embodiments of the present invention. The micro grid system stack 1250 is formed of 9 processors, two standard system data buses (1210, 1215), a micro grid system bus 1205, and a macro grid system bus 1220, to provide data transfer pathways of the micro grid system stack to wireless interfaces, I/O and other software connections of the assembled apparatus. The micro grid system stack 1250 is an example of a micro grid system stack generally. A micro grid system stack is comprised by a micro grid apparatus such as the micro grid apparatus 100 of FIG. 1 or FIG. 2A.

Various activities (e.g., research, manufacturing, etc.) may determine the specific structure of these two standard system data buses (1210, 1215). These standard system data buses (1210, 1215) could be used individually (e.g., one standard system data bus for inbound data, one standard system data bus for outbound data), as a bidirectional address bus, as a bidirectional data bus, or as a high speed 'on wafer' extendable address/data ring similar to token ring and other micro processor connection technologies. Thus, the present invention includes multiple design options in bus structure and interconnections and also includes both parallel and serial methods of data transfer.

The standard system bus (1210, 1215) provides for address and data interchange between the unique system processor 60 and all of the micro grid processors individually. Conscription of a micro grid processor to participate as a macro grid processor, including instruction to a micro grid processor to change its operating system, occurs over this standard system bus (1210, 1215). Micro grid processor status and availability, monitoring of micro grid processor utilization, and micro grid processor prioritization also occurs over this standard system bus (1210, 1215) by the unique processor 60. This standard system bus (1210, 1215) maintains the vitality of the micro grid and its resources.

The standard system bus (1210, 1215) also interconnects all of micro grid processors 65 to the RAM module 200, via memory control and cache memory control.

The standard system bus (1210, 1215) also interconnects the unique processor 60 to the I/O module 410 for detecting local attached alerts and interfacing with standard external peripheral system devices such as a disk drive for more permanent storage of data and instructions, and peripheral components such as monitors, keyboard, pointing devices, attached alert sensors and actuators.

The standard system bus (1210, 1215), also interconnects the unique processor 60 to the GPS module 420 for provision of location information and movement.

The standard system bus (1210, 1215) also interconnects the unique processor 60 to the communications module 425 for receiving wireless alerts from adjacent processors (but yet to be connected as macro grid processors) and cable communicated alerts from fiber optic and Ethernet connected sensors. The communications module 425 is also utilized by the macro grid processors for responding to alerts by instructing actuators to counter the event. The micro grid system bus 1205 provides for data interchange among any two (or groups) of the micro grid processors when assigned by the unique processor 60, to provide additional processing capacity to a macro grid processor. Once the micro grid participating processors are identified and assigned, and are acting as an active collaborating micro grid, the micro grid participating processors reduce their individual use of the standard system bus (1210, 1215) and utilize the micro grid system bus (1205). The present invention reduces data traffic volumes on the standard system bus (1210, 1215) and provides alternate micro grid address and data capacity via the micro grid system bus (1205) and further provides macro grid address and data capacity via the macro grid system bus (1220).

The macro grid system bus 1220 provides for data interchange from each processor of the macro grid processors individually via the wireless module 415 to other adjacent macro grid processors embodied within a macro grid. The artificial intelligence associated with the macro grid processor within the macro grid communicates to all the other macro grid processors within the macro grid.

The two standard system data bus (1210, 1215), the micro grid system bus 1205 and the macro grid system bus 1220, are all available as a system bus 55 at the five connection points of the complex shape with the individual irregular shaped modules. The system bus 55 serves as an embodiment of connection interface 55 (see FIG. 1).

The system bus 55 can be extended beyond the embodiment of one apparatus via a bridge module (i.e., a bi-polygonal irregular shaped module).

Figure 3A:
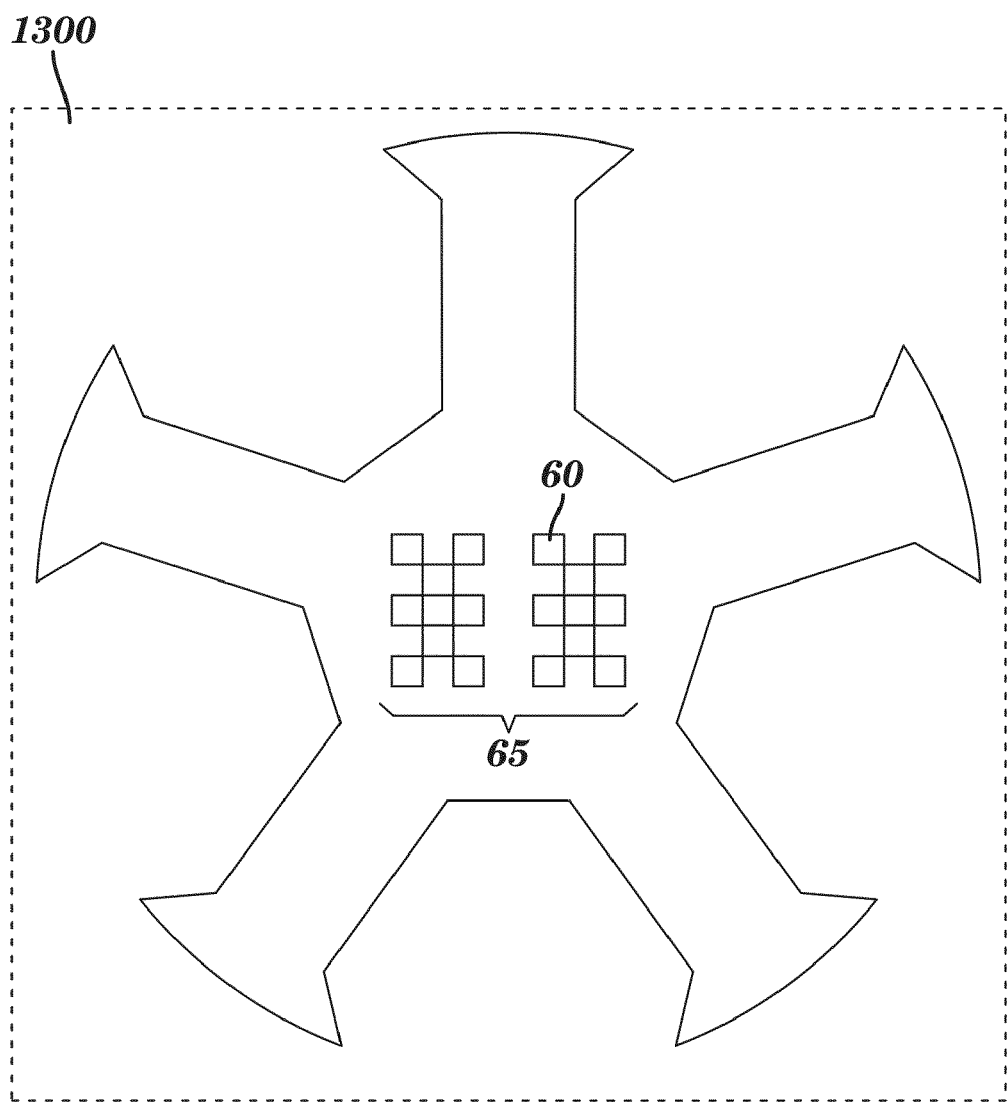
FIG. 3A depicts a micro grid apparatus, in accordance with embodiments of the present invention.

FIG. 3A depicts a micro grid apparatus 1300, in accordance with embodiments of the present invention. The micro grid apparatus 1300, which may in one embodiment comprise a complex ceramic chip apparatus, is for containment of a micro grid of 18 processors 65. The processors 65 each have its own operating system and operate under control of a unique processor 60 and its operating system, and are linked to each other via the system bus (1210, 1215), the micro grid bus 1205, and the macro grid bus 1220 (see FIG. 2B). The micro grid apparatus 1300 is analogous to the micro grid apparatus 100 of FIG. 2A.

Figure 3B:
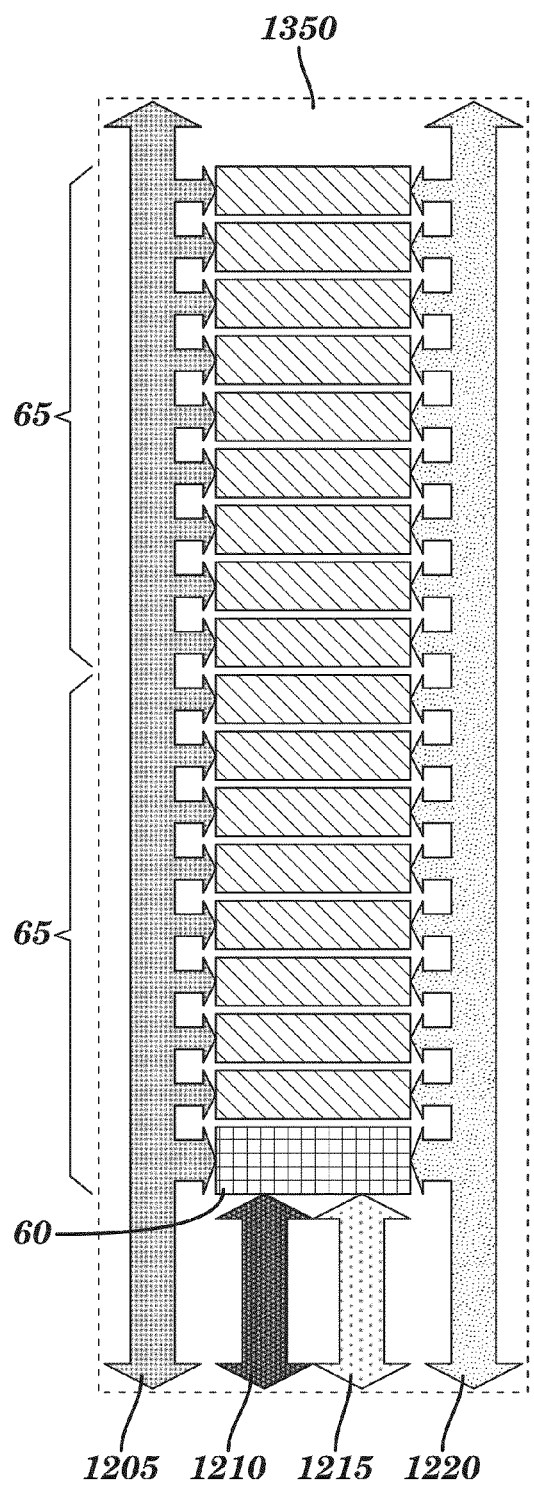
FIG. 3B depicts a micro grid system stack, in accordance with embodiments of the present invention.

FIG. 3B depicts a micro grid system stack 1350 of 18 processors 65, in accordance with embodiments of the present invention. The micro grid system stack 1350 comprises two standard system data buses (1210, 1215), a micro grid system bus 1205, and a macro grid system bus 1220 to provide data transfer pathways of the micro grid system stack to wireless interfaces, I/O and other necessary software connections of the assembled apparatus. The unique processor 60 with its own unique operating system resides at the first position in the micro grid stack of processors 65. The two groups of cell processors 65 are collectively embodied in the stack as a continuous row of available micro grid processors for determination of use, by the unique processor 60.

Figure 4A:
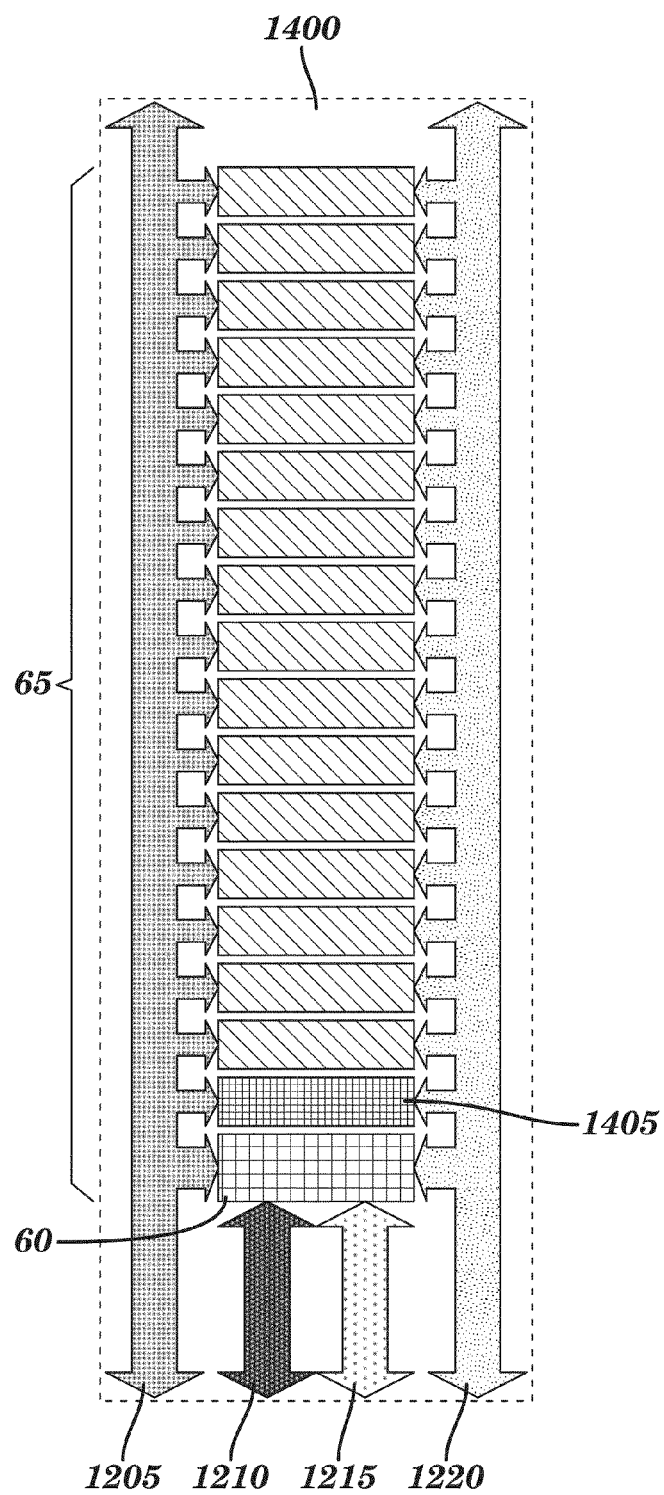
FIG. 4A depicts a micro grid system stack, in accordance with embodiments of the present invention.

FIG. 4A depicts a micro grid system stack 1400 of 18 processors 65, in accordance with embodiments of the present invention. The 18 processors 65 comprise a unique micro grid processor 60, a macro grid processor 1405 for a single artificial intelligence to interface, 16 micro grid processors 65, and micro grid system buses for data transfer and software connections, which include two standard system data buses (1210, 1215), a micro grid system bus 1205, and a macro grid system bus 1220.

An alert to the unique processor 60 may be detected via the I/O module 410 for the local and physically connected sensors to the apparatus; or via the communications module 425 receiving the alert wirelessly for remote sensors linked to the apparatus.

An external macro grid alert to the unique processor 60 (e.g., as received from the communication module 425's wireless connection to an adjacent macro grid processor) may contain an externally computed value of scale (S), wherein S is a function of a magnitude of the event (E), an urgency level for responding to the event (U), and a quash time for extinguishing the event (Q). The magnitude of the event (E) that triggered the alert is a numerical value within a predefined range of numerical values (e.g., a continuous range of values such as 1 to 10, a discrete set of values such as the integers 1, 2, 3, ..., 10, etc.). The urgency level (U) for responding to the event is a numerical value within a predefined range of numerical values (e.g., a continuous range of values such as 1 to 10, a discrete set of values such as the integers 1, 2, 3, ..., 10, etc.). The quash time (Q) for extinguishing the event is in units of seconds, minutes, hours, days, etc. In one embodiment, the magnitude of an event (E) is derived from GPS data received by the artificial intelligence from GPS modules (420) attached to participating micro grid apparatuses across the extremity of the geographical footprint of the macro grid.

In one embodiment, the urgency level (U) is derived from the TCP/IP sensors alert signal frequency (e.g., one alert signal per second, one alert signal per millisecond, etc.). In one embodiment, $S=(E \times U)/Q$. In one embodiment, E and U are independent of each other. In one embodiment, U is a function of E. For example, if U is a linear function of E, then S is proportional to $E^2/Q$.

The unique processor 60 assigns an internal micro grid processor to modify its operating system and becomes a macro grid processor of a macro grid, after which an artificial intelligence is generated for the macro grid. The macro grid processor created by the unique processor 60 queries the alert and determines the number of available micro grid processors 65 (e.g., from information provided by the unique processor in the micro grid stack) to be assigned for countering the event by either: (1) determining the scale of the event to be the scale (S) contained in the alert; or (2) determining the scale of the event by computing a value for the scale (S') of the response necessary to counter the event raised by an alert. The scale (S') is computed by an artificial intelligence of the macro grid; e.g., by using the same formula (e.g., $S'=(E \times U)/Q$ in one embodiment) as used for previously computing the scale S received by the unique processor 60 in the alert, but may differ in value from S due to U and/or Q being different for computing S' than for computing S (e.g., due to a change in U and/or Q having occurred from when S was computed to when S' is computed). In one embodiment, the number of available micro grid processors 65 to be assigned for countering the event is a non-decreasing function of the scale (S or S') of the event.

The artificial intelligence in the macro grid processor then requests other adjacent and wirelessly connectable unique processors to assign a micro grid processor to become a macro grid processor in a similar way. Accordingly, the macro grid begins to grow in footprint size and shape.

The scale (S) of the alert received by the unique processor 60 from an adjacent processor via the communication module's wireless may be predetermined by an artificial intelligence in the adjacent processor requesting assignment of a macro grid processor (including micro grid processing resources) from the unique processor 60.

Figure 4B:
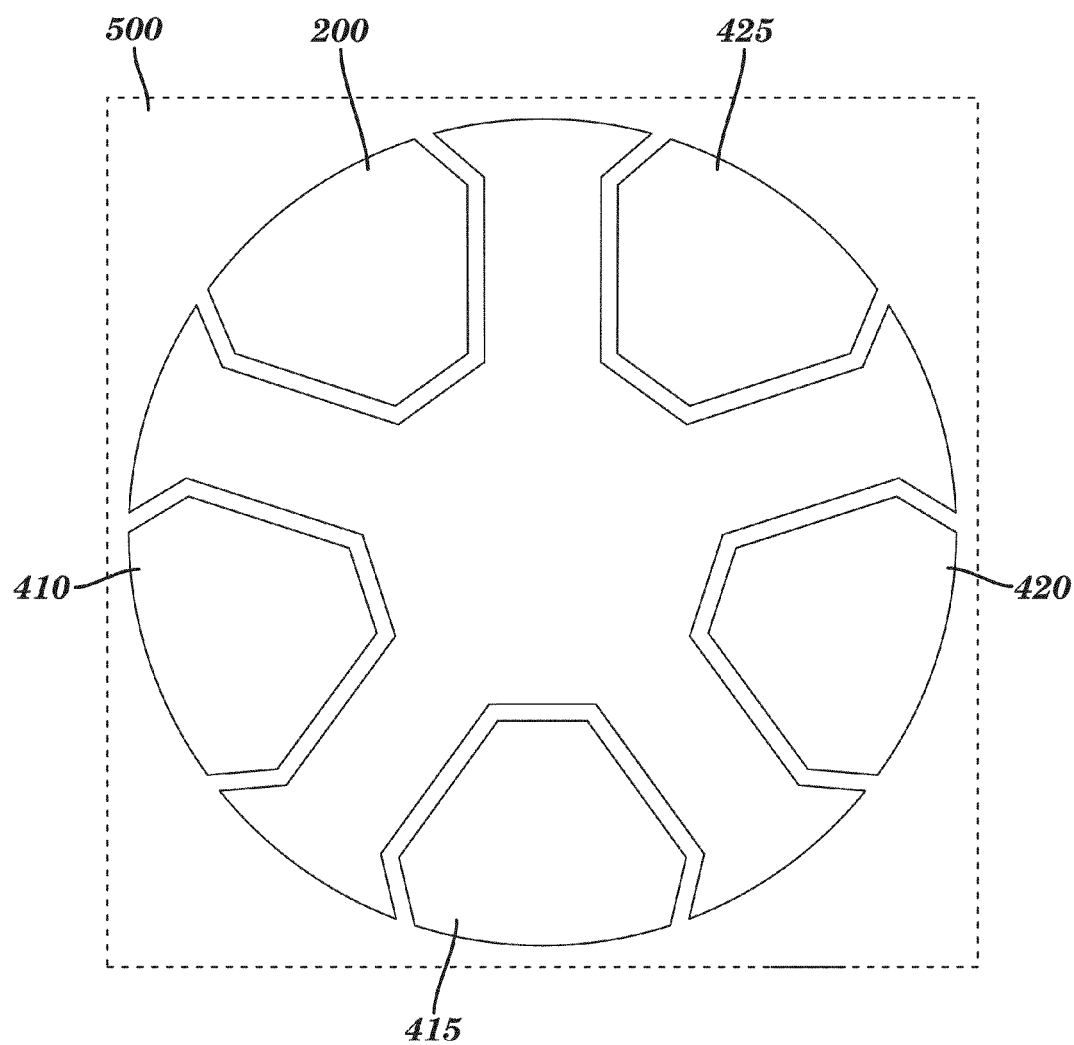
FIG. 4B depicts a micro grid apparatus, in accordance with embodiments of the present invention.

FIG. 4B depicts a micro grid apparatus 500, in accordance with embodiments of the present invention. The micro apparatus 500 contains of the hardware and software of a micro grid system stack in the complex shape of the micro grid apparatus 500. The micro grid apparatus 500 comprises the micro grid's system RAM 200, the micro grid's system communication 425, the micro grid's system GPS 420, the micro grid's system artificial intelligence wireless 415, and the micro grid's system I/O 410.

Figure 4C:
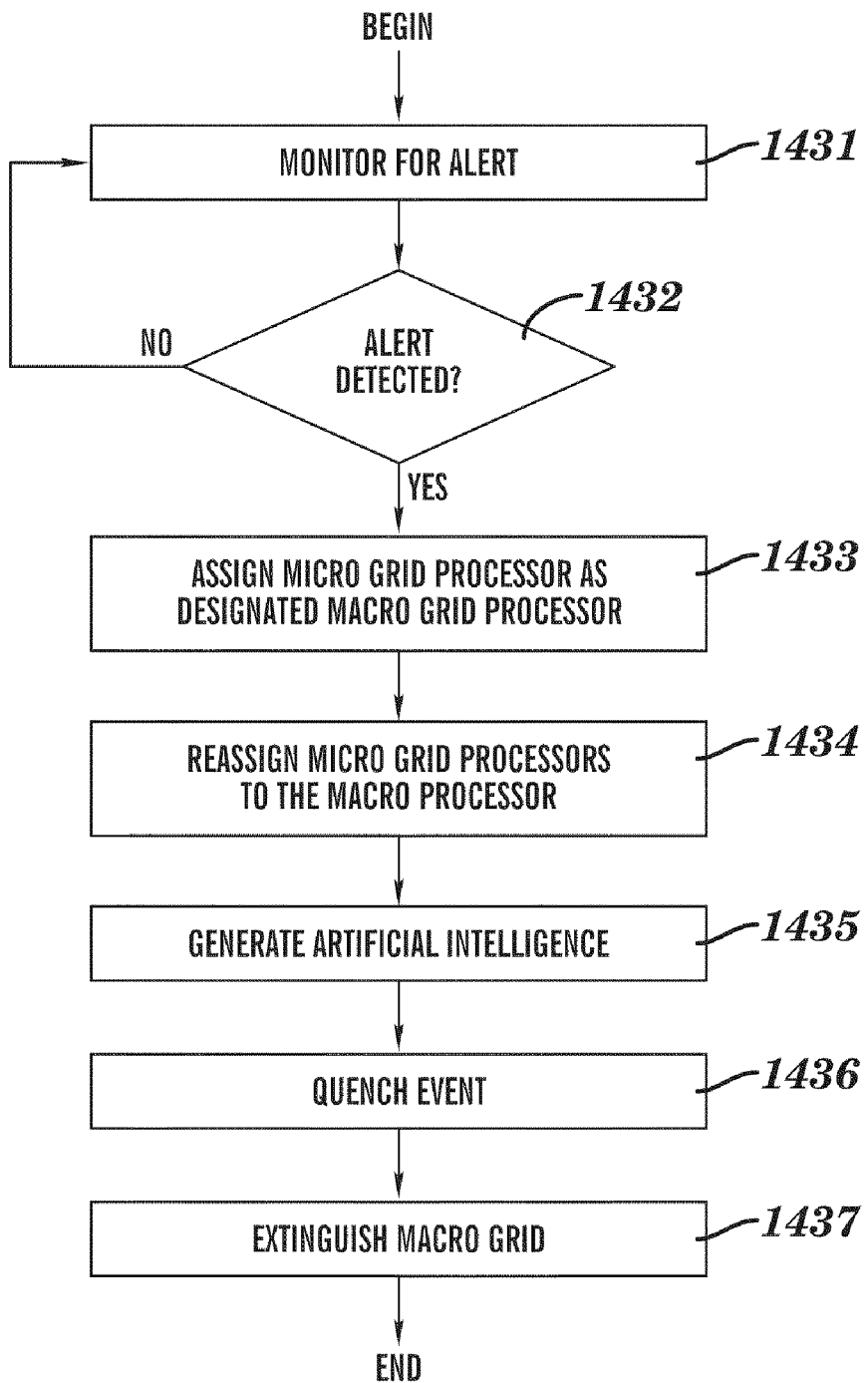
FIG. 4C is a flow chart describing a process for detecting an alert and for responding to the detected alert, in accordance with embodiments of the present invention.

FIG. 4C is a flow chart describing a process for detecting an alert and for responding to the detected alert, in accordance with embodiments of the present invention. The flowchart of FIG. 4C comprises steps 1431-1437.

In step 1431, the unique processor 60 constantly monitors the system bus (1210, 1215) for an 'alert data packet': (1) from any sensor directly connected to the I/O irregular shaped module 410 or to the communications module 425; or (2) from any external micro grid apparatus or any macro grid that is connected wirelessly or by direct electrical connection to the micro grid apparatus 100. An alert data packet comprises an alert pertaining to an event.

The 'alert data packet' may contain a computed value of scale (as defined supra) to assist in determining the number of micro grid resources required to assist with countering the event from the location of the external micro grid apparatus. GPS information from the GPS module 420 may be constantly queried to determine a 'location value' for advising the artificial intelligence (generated in step 1435) as to where the event is, and as a consequence, influencing the macro grid operating system to increase or decrease the number of micro grid processing resources participating from within the single apparatus.

Step 1432 determines whether the unique processor 60 has detected a data packet comprising the alert in step 1431. If step 1433 determines that the unique processor 60 has detected a data packet comprising the alert, then step 1433 is next; otherwise the process loops back to step 1431 to monitor for an alert.

In step 1433, via the micro grid bus 1205, the unique processor 60 initiates a response to the alert by identifying an available micro grid processor within the micro grid apparatus comprising the unique processor 60, designates the available micro grid processor to be a designated macro grid processor by altering the operating system of the available micro grid processor to a macro grid operating system, and assigns to the designated macro grid processor an alert ownership of a macro grid with an associated responsibility for the operation of the macro grid.

The designated macro grid processor assigns one or more additional processors from the micro grid apparatus comprising the unique processor 60 as micro grid computational resources are required by the macro grid. The total number of the one or more additional processors assigned as computational resources for the micro grid is a function of the scale of the alert. The macro grid operating system comprises software configured, upon being implemented (i.e., performed), to respond to the event associated with the detected alert.

In one embodiment, step 1434 is performed if warranted by the nature of the event and/or scale of the alert. In step 1434, the designated macro grid processor communicates the 'alert data packet' to the unique micro grid processor(s) in one or more different micro grid apparatuses, via the wireless irregular shaped module 415 for connection. The unique micro grid processor in each micro grid apparatus of the one or more different micro grid apparatuses assigns a micro grid processor in its micro grid apparatus to become an additional macro grid processor of the macro grid. The assembled macro grid communicates via the wirelessly connected macro grid system bus 1220. Each macro grid processor of the designated macro grid processors may assign one or more additional processors from its micro grid apparatus as computational resources for the macro grid. In one embodiment, the initially designated macro grid processor directs and oversees the operation of all of the other macro grid processors of the macro grid.

In one embodiment, step 1434 is not performed and the macro grid consequently has exactly one macro grid processor, namely the designated macro grid processor.

In step 1435, an artificial intelligence is generated for the macro grid by the designated macro grid processor. In one embodiment, the artificial intelligence is stored only in one macro grid processor (e.g., the designated macro grid processor) of the macro grid. In one embodiment, a different portion of the artificial intelligence is stored in some but not all macro grid processors of the macro grid. In one embodiment, a different portion of the artificial intelligence is stored in each macro grid processor of the macro grid.

The macro grid may dynamically expand or contract as the event increases or decreases, respectively. If the alert is of a predefined scale (as defined supra) requiring additional computational resources, or if a matched alert is detected in other micro grid apparatus(es) than the micro grid apparatus that detected the alert in step 1432, then micro grid processors within the other apparatus(s) are assigned to the artificial intelligence as computational resources. A "matched alert" is defined as an alert that communicates an enhancement of the event associated with the original alert detected in step 1432. As the event diminishes, macro grid processors and/or micro grid processors assigned as computational resources are removed from the macro grid.

In step 1436, the event associated with the alert is responded to and quenched by the artificial intelligence. The manner in which the macro grid responds to and quenches the event is specific to the event, as illustrated in three hypothetical examples which are described infra.

As the scale of the alert (as defined supra) is reduced such that fewer computational resources are needed to combat the event associated with the alert. Accordingly, the artificial intelligence returns no longer needed macro grid processors back to associated micro grid processors under the control of the unique processor of the micro grid apparatus that comprises each associated micro grid processor.

If a previously occurring matched alert disappears, then the artificial intelligence will commence returning the conscripted additional macro grid processors back to the control of the corresponding unique processor in the micro grid apparatus that is wirelessly connected the micro grid apparatus 100. Eventually the designated macro grid processor itself is returned as a micro grid processor to the micro grid apparatus 100, resulting in the artificial intelligence vacating the macro grid and the macro grid disappearing, thus extinguishing the macro grid and all of its included macro processors, along with the artificial intelligence, in step 1437.

Figure 4D:
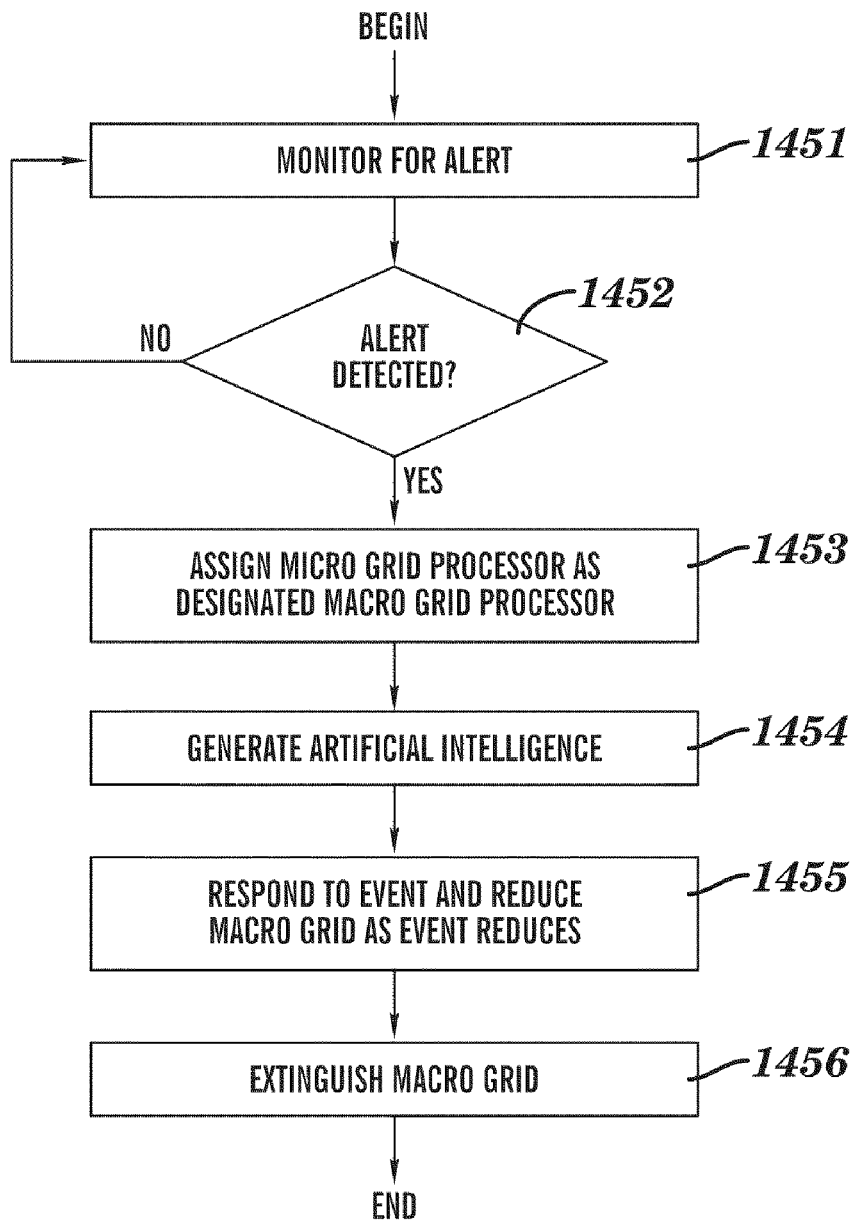
FIG. 4D is a flow chart describing a process for detecting an alert and for responding to the detected alert, in accordance with embodiments of the present invention.

FIG. 4D is a flow chart describing a process for detecting and for responding to the detected alert, in accordance with embodiments of the present invention. The flow chart of FIG. 4D comprises steps 1451-1456.

In step 1451, the unique processor 60 constantly monitors the system bus (1210, 1215), via the communications module 425 of the micro grid apparatus 100, for an 'alert data packet': (1) from any sensor directly connected to the I/O irregular shaped module 410 or to the communications module 425; or (2) from any external micro grid apparatus or any macro grid that is connected wirelessly or by direct electrical connection to the micro grid apparatus 100. An alert data packet comprises an alert pertaining to an event.

The 'alert data packet' may contain a computed value of scale (as defined supra) to assist in determining the number of micro grid resources required to assist with countering the event from the location of the external micro grid apparatus. GPS information from the GPS module 420 may be constantly queried to determine a 'location value' for advising the artificial intelligence (generated in step 1454) as to where the event is, and as a consequence, influencing the macro grid operating system to increase or decrease the number of micro grid processing resources participating from within the single apparatus.

Step 1452 determines whether the unique processor 60 has detected a data packet comprising the alert in step 1451. If step 1452 determines that the unique processor 60 has detected a data packet comprising the alert then step 1453 is next performed; otherwise the process loops back to step 1451.

In step 1453, via the micro grid bus 1205, the unique processor 60 initiates a response to the alert by identifying an available micro grid processor within the micro grid apparatus comprising the unique processor 60, designates the available micro grid processor as a macro grid processor by altering the operating system of the available micro grid processor to a macro grid operating system, and assigns to the designated macro grid processor an alert ownership of a macro grid with an associated responsibility for the operation of the macro grid.

In step 1454, an artificial intelligence is generated for the macro grid, under control of the unique processor 60, and is stored in the designated macro grid processor. The artificial intelligence stored in the designated macro grid processor, upon being implemented, may assign one or more additional processors from its micro grid apparatus as computational resources are for the macro grid.

In one embodiment, the artificial intelligence stored in the designated macro grid processor may trigger generation of other macro grid processors if warranted by the nature of the event and/or scale of the alert. Specifically, the artificial intelligence stored in the designated macro grid communicates with the unique micro grid processor in one or more different micro grid apparatuses to direct the unique micro grid processor in each micro grid apparatus of the one or more different micro grid apparatuses to assign a micro grid processor in its micro grid apparatus to become an additional macro grid processor of the macro grid. In one embodiment, the artificial intelligence stored in the designated macro grid processor may affirm or negate the choice of the additional macro grid processor by the unique micro grid processor in each micro grid apparatus.

In one embodiment, the artificial intelligence does not trigger generation of other macro grid processors and the macro grid consequently has exactly one macro grid processor, namely the designated macro grid processor.

If generation of other macro grid processors is triggered, the artificial intelligence stored in the designated macro grid processor may generate, or trigger the generating of, other artificial intelligences to generate or develop a resultant artificial intelligence. In one embodiment, the artificial intelligence is stored only in one macro grid processor (e.g., the designated macro grid processor) of the macro grid. In one embodiment, a different portion of the artificial intelligence is stored in some but not all macro grid processors of the macro grid. In one embodiment, a different portion of the artificial intelligence is stored in each macro grid processor of the macro grid.

If the alert is of a predefined scale (as defined supra) requiring additional computational resources, or if a matched alert (as defined supra) is detected in other micro grid apparatus(s) than the micro grid apparatus that detected the alert in step 1452, then micro grid processors within the other apparatus(s) are assigned to the artificial intelligence as computational resources.

In step 1455, the event is responded to by the artificial intelligence. The manner in which the macro grid and artificial intelligence responds to and quenches the event is specific to the event, as illustrated in three hypothetical examples which are described infra.

As the scale of the alert (as defined supra) is reduced such that fewer computational resources are needed to combat the event associated with the alert. Accordingly, the artificial intelligence returns no longer needed macro grid processors back to associated micro grid processors under the control of the unique processor of the micro grid apparatus that comprises each associated micro grid processor.

If a previously occurring matched alert disappears, then the artificial intelligence will commence returning the conscripted additional macro grid processors back to the control of the corresponding unique processor in the micro grid apparatus that is wirelessly connected the micro grid apparatus 100. Eventually the designated macro grid processor itself is returned as a micro grid processor to the micro grid apparatus 100, resulting in the artificial intelligence vacating the macro grid and the macro grid disappearing, thus extinguishing the macro grid and all of its included macro processors, along with the artificial intelligence, in step 1456.

Figure 4E:
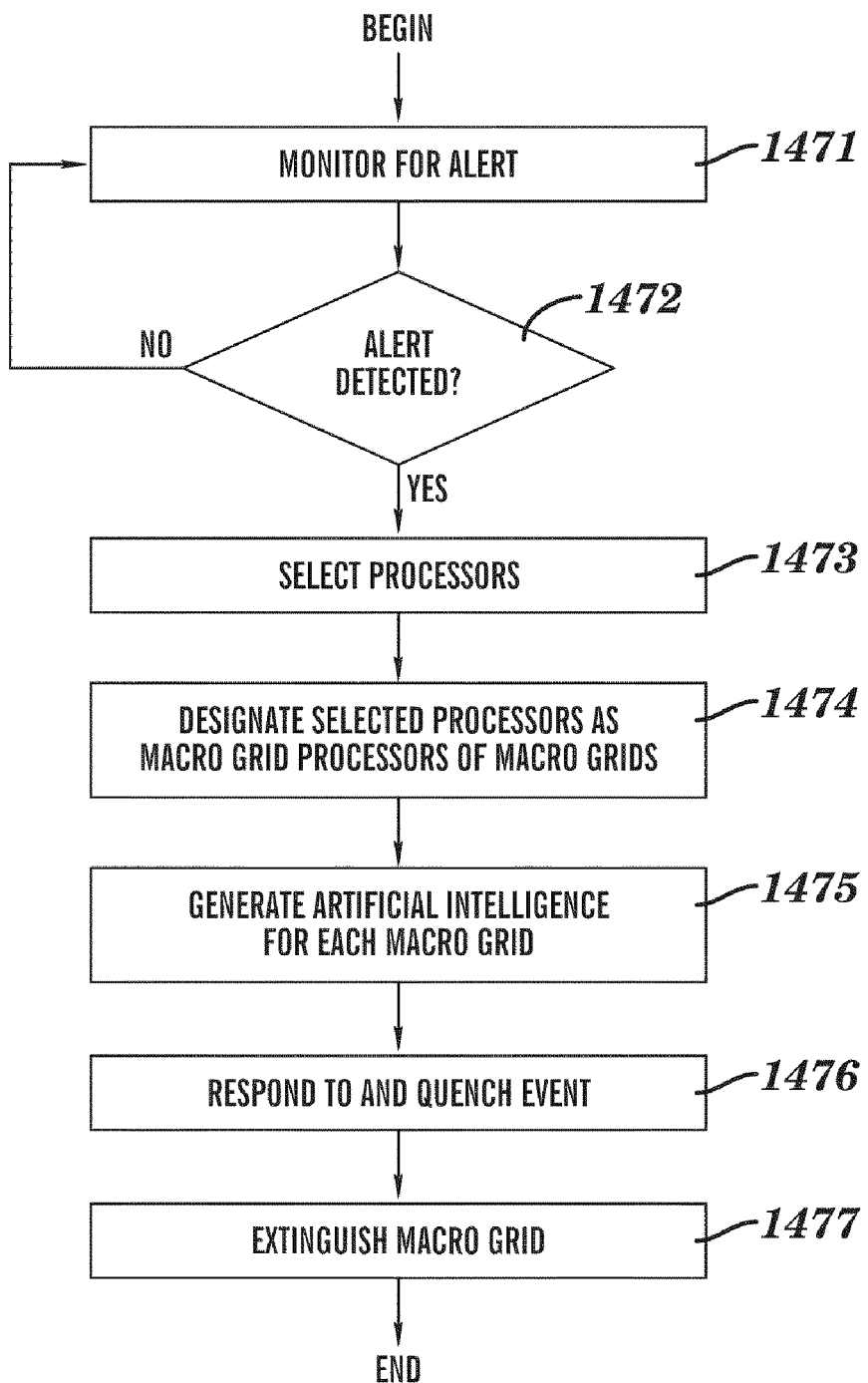
FIG. 4E is a flow chart describing a process for detecting an alert and for responding to the detected alert, in accordance with embodiments of the present invention.

FIG. 4E is a flow chart describing a process for detecting an alert and for responding to the detected alert, in accordance with embodiments of the present invention. The flow chart of FIG. 4E comprises steps 1471-1477.

In step 1471, the unique processor 60 constantly monitors the system bus (1210, 1215), via the communications module 425 of the micro grid apparatus 100, for an 'alert data packet': (1) from any sensor directly connected to the I/O irregular shaped module 410 or to the communications module 425; or (2) from any external micro grid apparatus or any macro grid that is connected wirelessly or by direct electrical connection to the micro grid apparatus 100. An alert data packet comprises an alert pertaining to an event.

The 'alert data packet' may contain a computed value of scale (as defined supra) to assist in determining the number of micro grid resources required to assist with countering the event from the location of the external micro grid apparatus. GPS information from the GPS module 420 may be constantly queried to determine a 'location value' for advising the artificial intelligence (generated in step 1475) as to where the event is, and as a consequence, influencing the macro grid operating system to increase or decrease the number of micro grid processing resources participating from within the single apparatus.

Step 1472 determines whether the unique processor 60 has detected a data packet comprising the alert in step 1471. If step 1472 determines that the unique processor 60 has detected a data packet comprising the alert then step 1473 is next performed; otherwise the process loops back to step 1471.

In step 1473, after detecting the alert data packet in step 1472, each unique processor selects at least one processor from each micro grid apparatus.

In step 1474, each selected processor is designated as a macro grid processor of a respective macro grid by altering an operating system of each selected processor to a macro grid operating system and by assigning to each selected processor a responsibility for operation of its respective macro grid.

In step 1475, an artificial intelligence is generated for each macro grid.

In step 1476, the event is responded to and quenched by implementing the artificial intelligence of each macro grid.

In step 1477 after the event has been quenched, the macro grids are extinguished.

In one embodiment, at least one micro grid apparatus comprises a plurality of micro grid apparatuses, wherein step 1474 results in the respective macro grids comprising a plurality of macro grids, and wherein implementing the artificial intelligence of each macro grid in step 1476 comprises contemporaneously implementing the artificial intelligence of each macro grid to perform said responding to and quenching the event.

In one embodiment for each macro grid, one or more processors in each micro grid apparatus, other than the selected processors in each micro grid apparatus, are assigned as computational resources for each macro grid.

In one embodiment, at least two macro grids include a different macro grid processor selected from a same micro grid apparatus.

In one embodiment, the process geographically relocates at least one macro grid processor of a first macro grid, which results in the first macro grid having its geographical footprint increased or decreased.

In one embodiment, the alert data packet includes an identification of a scale (S), wherein S is a function of a magnitude of the event (E), an urgency level for responding to the event (U), and a quash time for extinguishing the event (Q). The scale (S) identified in the alert data packet may be used to determine a total number of processors of the at least one processor to be selected from each micro grid apparatus during said selecting the at least one processor from each micro grid apparatus in step 1473. In one embodiment, S=(E×U)/Q.

In one embodiment, the artificial intelligence for a first macro grid of the plurality of macro grids ascertains that the scale is increased relative to the scale identified in the alert data packet which triggers adding at least one macro grid processor to the first macro grid, resulting in the first macro grid having its geographical footprint increased In one embodiment, the artificial intelligence for a first macro grid of the plurality of macro grids ascertains that the scale is decreased relative to the scale identified in the alert data packet which triggers removing at least one macro grid processor from the first macro grid, resulting in the first macro grid having its geographical footprint decreased.

Other embodiments, as described supra in conjunction with the process of FIG. 4C and/or FIG. 4D, are likewise applicable to the process of FIG. 4E.

Figure 5A:
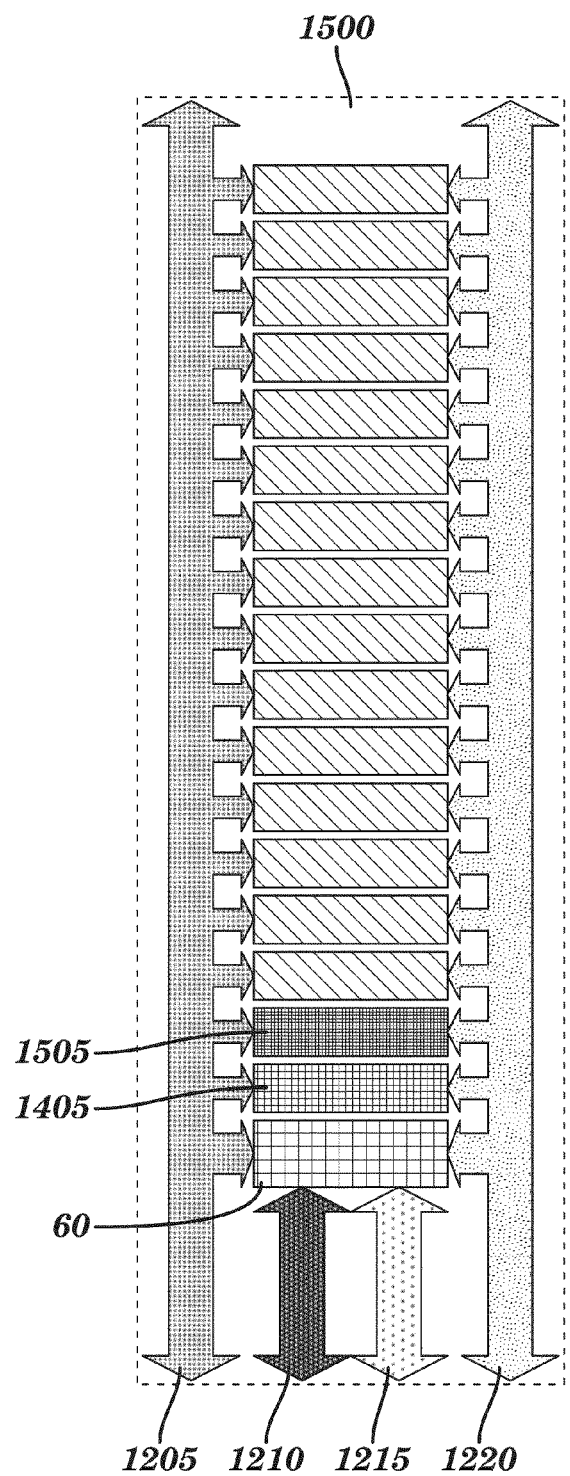
FIG. 5A depicts a micro grid system stack of 18 processors, in accordance with embodiments of the present invention.

FIG. 5A depicts a micro grid system stack 1500 of 18 processors, in accordance with embodiments of the present invention. The micro grid system stack 1500 comprises a unique micro grid processor 60, two designated macro grid processors (1405, 1505) of two corresponding macro grids, and 15 micro grid processors (as additional processing resources, some or all of which being allocated to the two designated macro grid processors (1405, 1505)). The two corresponding macro grids exist contemporaneously and have two corresponding artificial intelligences co-existing in the same micro grid apparatus (i.e., in the same micro grid system stack 1500).

Figure 5B:
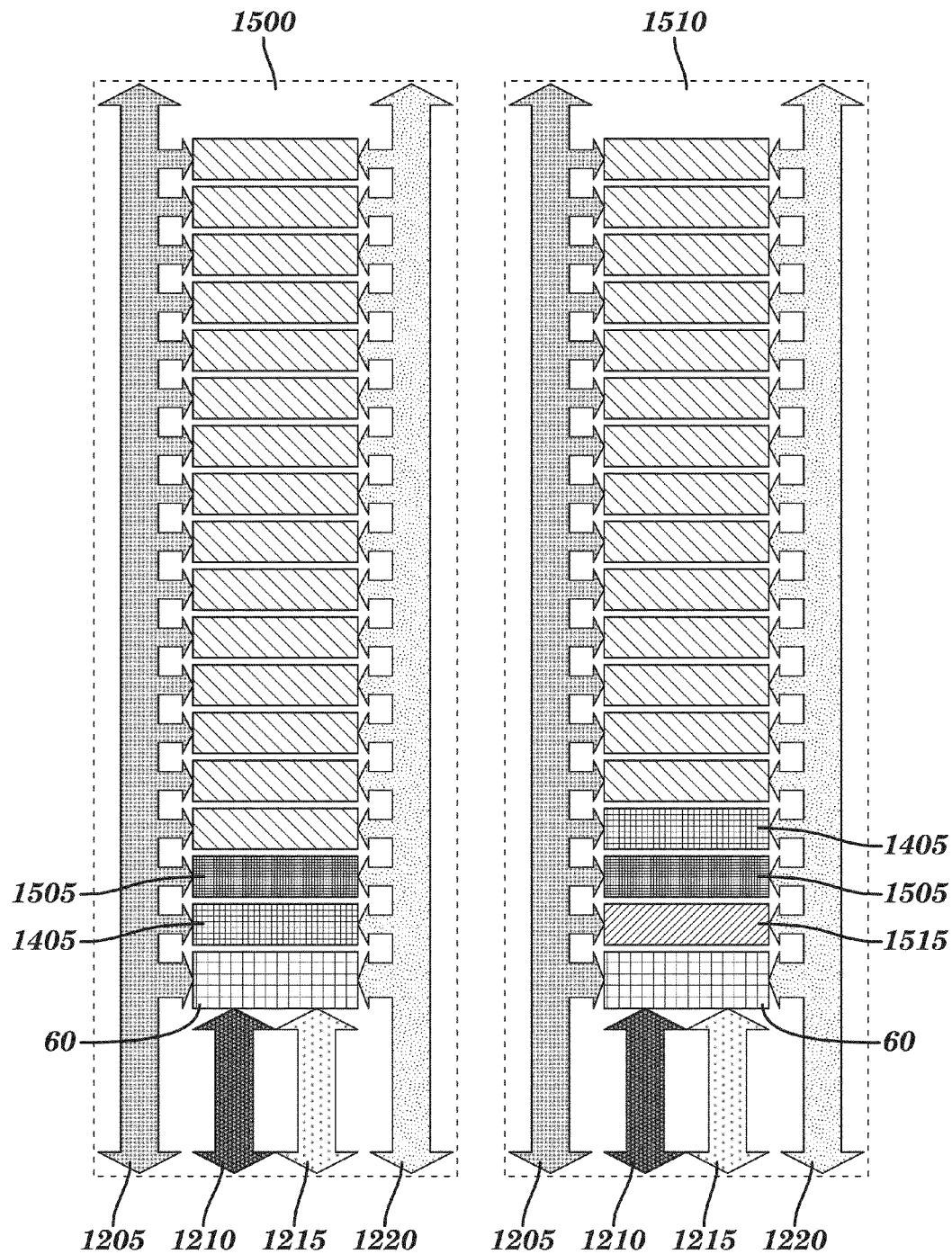
FIG. 5B depicts two micro grid system stacks, each stack comprising 18 processors, in accordance with embodiments of the present invention.

FIG. 5B depicts two micro grid system stacks (1500, 1510), each stack comprising 18 processors, in accordance with embodiments of the present invention. Each stack is in a different micro grid apparatus. The 18 processors in each stack are adjacent to one another and are directly connected electrically or wirelessly connected to each other within a micro grid apparatus. The stack 1500 comprises a unique micro grid processor 60, two designated macro grid processors (1405, 1505) of two corresponding macro grids, and 15 micro grid processors (as additional processing resources, some or all of which being allocated to the two designated macro grid processors (1405, 1505)). The stack 1510 comprises a unique micro grid processor 60, three designated macro grid processors (1515, 1505, 1405) of three corresponding macro grids, and 14 micro grid processors (as additional processing resources, some or all of which being allocated to the three designated macro grid processors (1515, 1505, 1405)).

In FIG. 5B, a first macro grid comprises macro grid processor 1405 of stack 1500 and macro grid processor 1405 of stack 1510, said first macro grid having a first artificial intelligence. A second macro grid comprises macro grid processor 1505 of stack 1500 and macro grid processor 1505 of stack 1510, said second macro grid having a second artificial intelligence. A third macro grid comprises macro grid processor 1515 of stack 1510, said third macro grid having a third artificial intelligence. Each macro grid in FIG. 5B is formed by the process depicted in FIG. 4C or FIG. 4D.

Figure 5C:
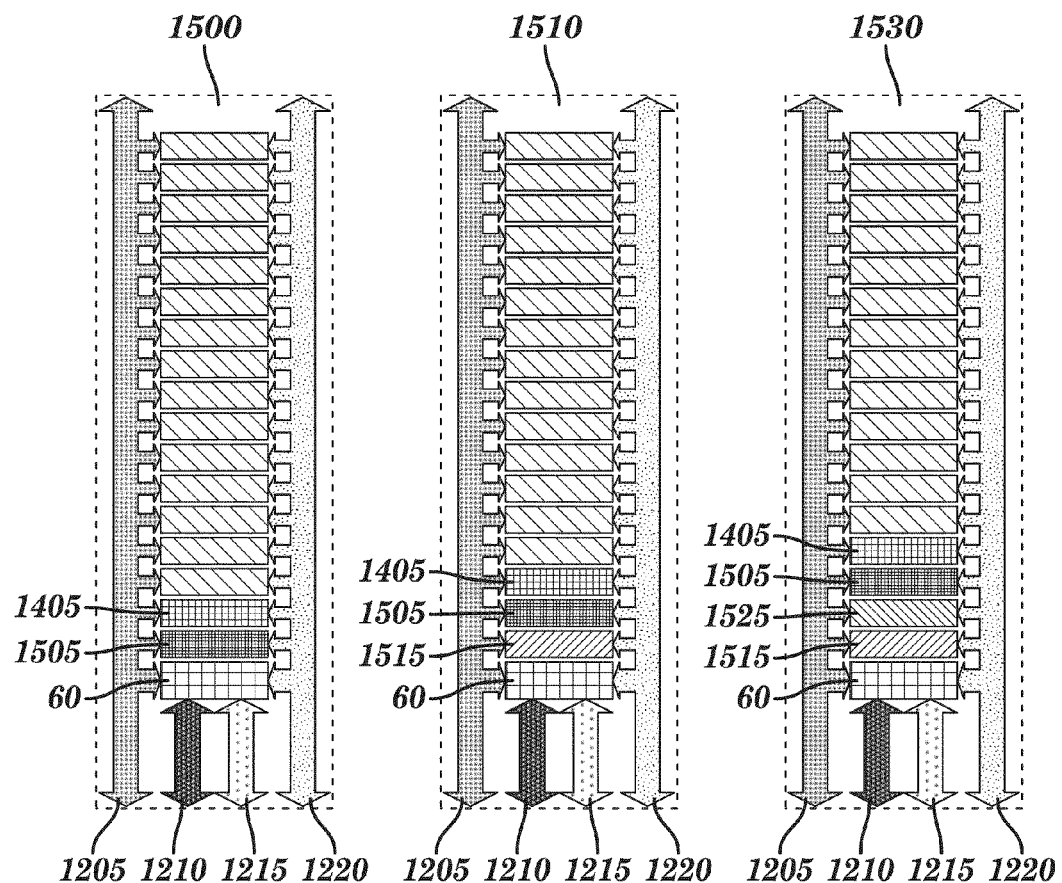
FIG. 5C depicts three micro grid system stacks, each stack comprising 18 processors, in accordance with embodiments of the present invention.

FIG. 5C depicts three micro grid system stacks (1500, 1510, 1530), each stack comprising 18 processors, in accordance with embodiments of the present invention. Each stack is in a different micro grid apparatus. The 18 processors in each stack are adjacent to one another and are directly connected electrically or wirelessly connected to each other within a micro grid apparatus. The stack 1510 is disposed between stacks 1500 and 1530. The stack 1500 comprises a unique micro grid processor 60, two designated macro grid processors (1505, 1405) of two corresponding macro grids, and 15 micro grid processors (as additional processing resources, some or all of which being allocated to the two designated macro grid processors (1505, 1405)). The stack 1510 comprises a unique micro grid processor 60, three designated macro grid processors (1515, 1505, 1405) of three corresponding macro grids, and 14 micro grid processors (as additional processing resources, some or all of which being allocated to the three designated macro grid processors (1515, 1505, 1405)). The stack 1530 comprises a unique micro grid processor 60, four designated macro grid processors (1515, 1525, 1505, 1405) of four corresponding macro grids, and 13 micro grid processors (as additional processing resources, some or all of which being allocated to the four designated macro grid processors (1515, 1525, 1505, 1405)).

In FIG. 5C, a first macro grid comprises macro grid processor 1405 of stack 1500, macro grid processor 1405 of stack 1510, and macro grid processor 1405 of stack 1530, said first macro grid having a first artificial intelligence. A second macro grid comprises macro grid processor 1505 of stack 1500, macro grid processor 1505 of stack 1510, and macro grid processor 1505 of stack 1530, said second macro grid having a second artificial intelligence. A third macro grid comprises macro grid processor 1515 of stack 1510 and macro grid processor 1515 of stack 1530, said third macro grid having a third artificial intelligence. A fourth macro grid comprises macro grid processor 1525 of stack 1530, said fourth macro grid having a fourth artificial intelligence.

In FIG. 5C: (1) each of the three micro grid system stacks (1500, 1510, 1530) has a unique processor 60; (2) one of the micro grid system stacks (1530) has a macro grid processor (1525) not found in the other two adjacent physical apparatus's (1500, 1510); (3) two of the micro grid system stacks (1510, 1530) have a macro grid processor (1515) participating in the same third macro grid; (4) all three of the micro grid system stacks (1500, 1510, 1530) have two macro grid processors (1405, 1505) participating in the first and second macro grid, respectively; and (5) a total of four macro grids are present in the three micro grid system stacks (1500, 1510, 1530), and are functioning contemporaneously, each controlled by their own individual artificial intelligence.

Figure 5D:
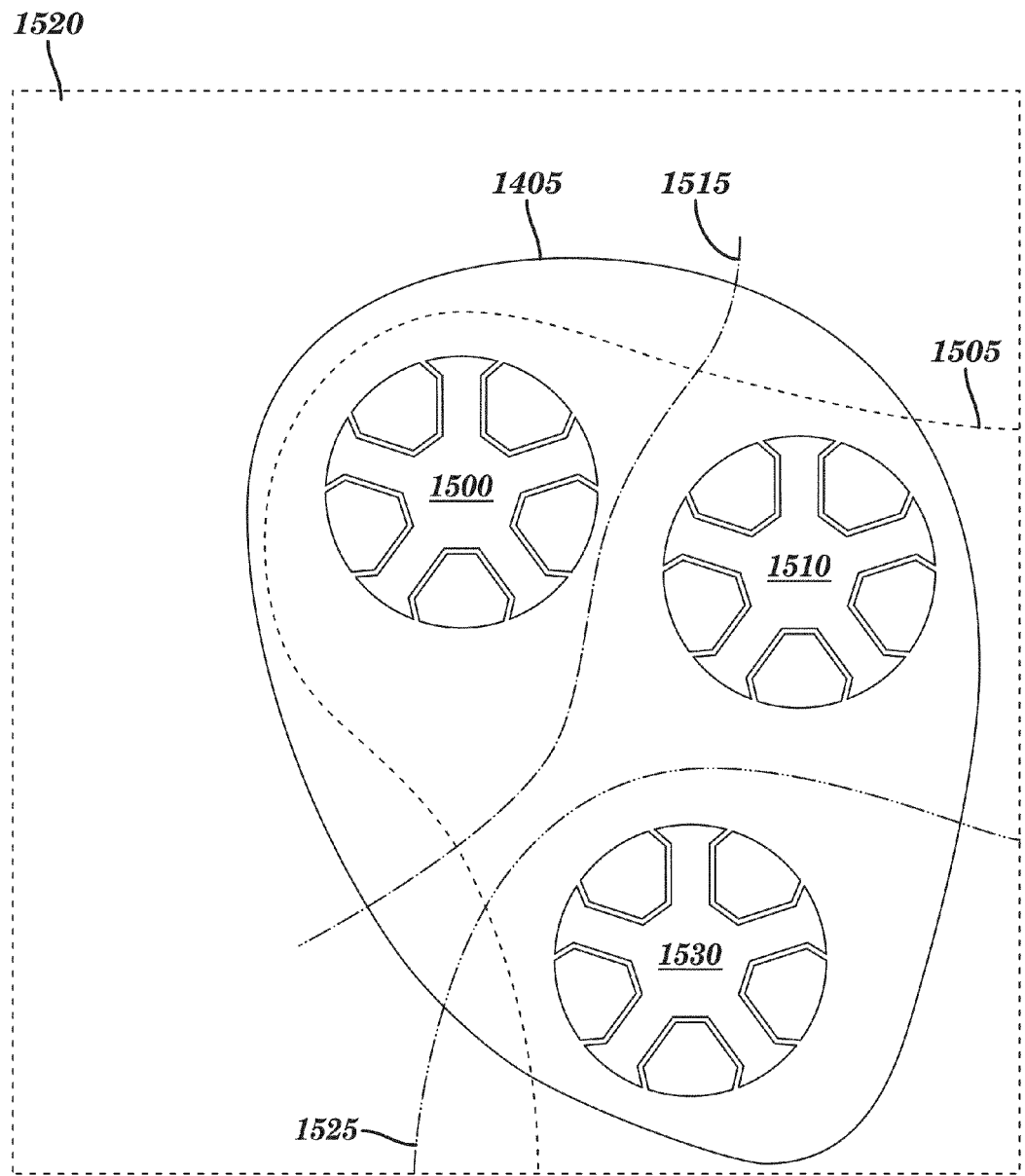
FIG. 5D is a diagram of a geographic area comprising the four macro grids associated with the three micro grid system stacks of FIG. 5C, in accordance with embodiments of the present invention.

FIG. 5D is a diagram of a geographic area 1520 comprising the four macro grids associated with the three micro grid system stacks (1500, 1510, 1530) of FIG. 5C, in accordance with embodiments of the present invention. FIG. 5D depicts the micro grid apparatuses that comprise the three micro grid system stacks (1500, 1510, 1530). The three mobile micro grid system stacks (1500, 1510, 1530) are adjacent to each other and wirelessly connected to each other in the manner described supra in conjunction with FIG. 5C. Each micro grid system stack contains different combinations of macro grid processors, which are illustrated by the shape and boundaries of the respective geographical footprint of the macro grids. Each geographical footprint in FIG. 5D is identified by the macro grid processor (1405, 1505, 1515, 1525) included in its respective macro grid. Each macro grid is governed by its own artificial intelligence. In one embodiment, the geographic area 1520 is several hundred meters across.

Figure 6A:
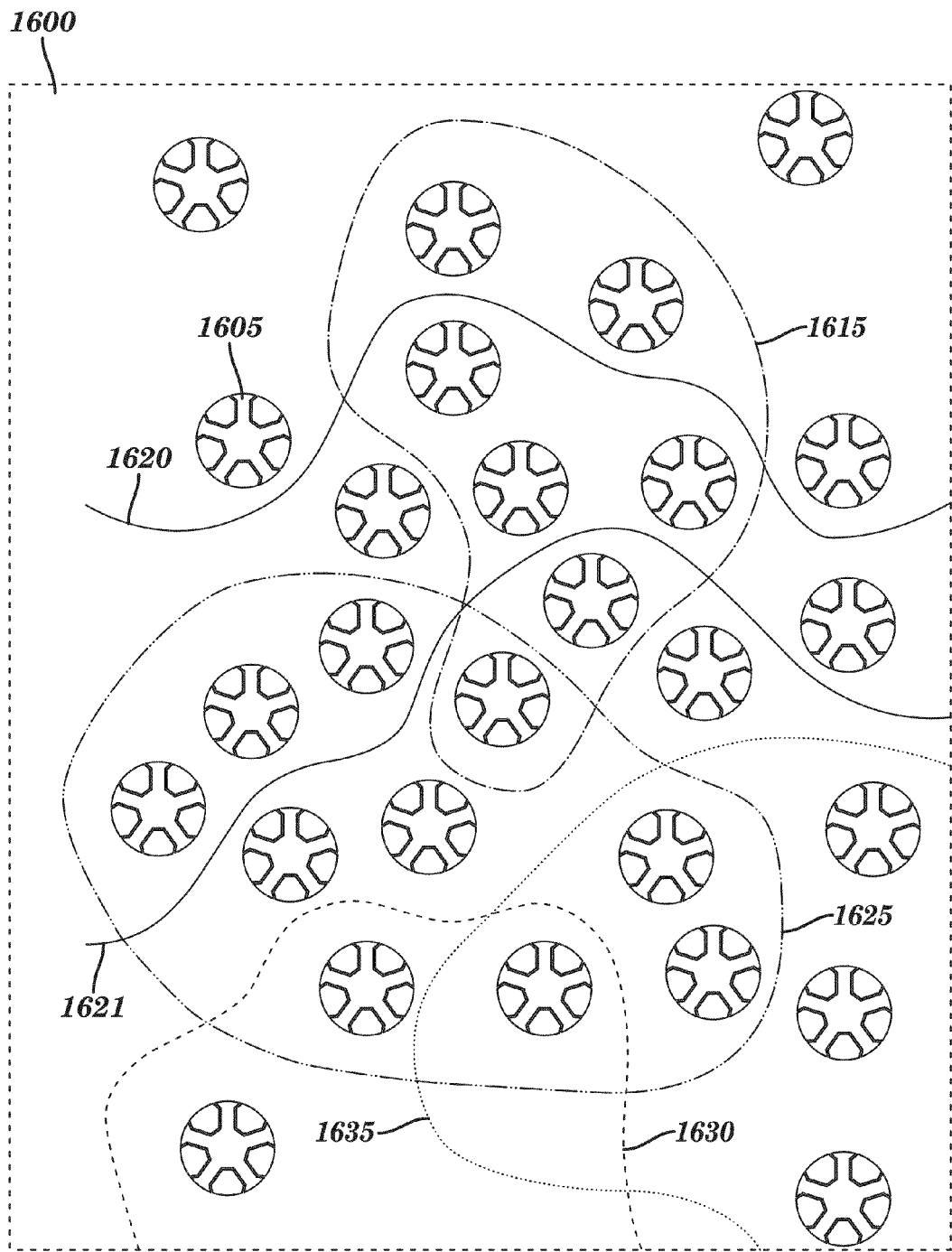
FIG. 6A is a diagram of a geographic area comprising 5 macro grids and 27 micro grid apparatuses, in accordance with embodiments of the present invention.

FIG. 6A is a diagram of a geographic area 1600 comprising 5 macro grids and 27 micro grid apparatuses, in accordance with embodiments of the present invention. FIG. 6A depicts a distribution of micro grid apparatuses within the 5 macro grids. Each micro grid apparatus in FIG. 6A comprises its micro grid system stack, as explained supra. Some or all of the 27 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6A is identified by the macro grid processor (1615, 1620, 1625, 1630, 1635) included in its respective macro grid. The two portions of the footprint of the macro grid 1620 depicted in FIG. 6A are connected to each other outside of the geographic area 1600 and thus collectively form a single continuous footprint. Each macro grid is governed by its own artificial intelligence. In one embodiment, the geographic area 1600 is one kilometer across. At least one micro grid apparatus (denoted by its micro grid system stack 1605) is not connected or participant to any of the macro grids.

Figure 6B:
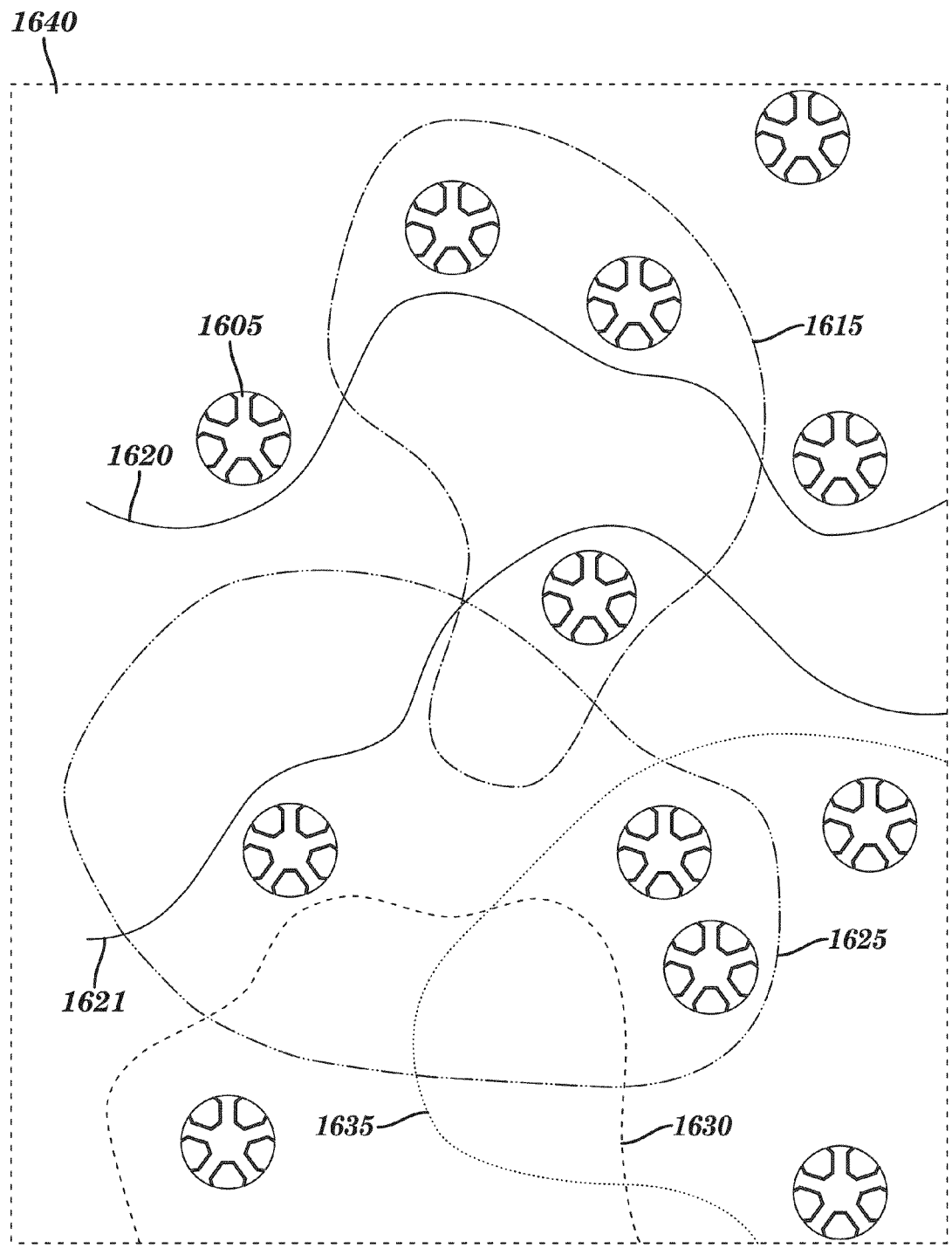
FIG. 6B is a diagram of a geographic area comprising 5 macro grids and 12 micro grid apparatuses and being later in time than the geographic area in FIG. 6A, in accordance with embodiments of the present invention.

FIG. 6B is a diagram of a geographic area 1640 comprising the 5 macro grids of FIG. 6A and 12 micro grid apparatuses, in accordance with embodiments of the present invention. FIG. 6B depicts a distribution of micro grid apparatuses within the 5 macro grids. The 12 micro grid apparatuses in FIG. 6B is a subset of the 27 micro grid apparatuses in FIG. 6A. The geographical area 1640 of FIG. 6B is later in time than is the geographical area 1600 of FIG. 6A and either encompasses or is a subset of the geographical area 1600. Each micro grid apparatus in FIG. 6B comprises its micro grid system stack, as explained supra. Some or all of the 12 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6B is identified by the macro grid processor (1615, 1620, 1625, 1630, 1635) included in its respective macro grid. Each macro grid is governed by its own artificial intelligence. In one embodiment, the geographic area 1640 is one kilometer across. At least one micro grid apparatus (denoted by its micro grid system stack 1605) is not connected or participant to any of the macro grids. One of the macro grid macro grids (1620) has experienced a decaying artificial intelligence and is disappearing due to removal of all of its participating macro grid processors. The geographical footprints of the other macro grids are reducing in size as their alert scale value reduces. The distribution of micro grid apparatuses within the 5 macro grids of FIG. 6B differ from the distribution of micro grid apparatuses within the same 5 macro grids of FIG. 6A due to the dynamic evolution the 5 macro grids from the time associated with FIG. 6A to the time associated with FIG. 6B.

Figure 6C:
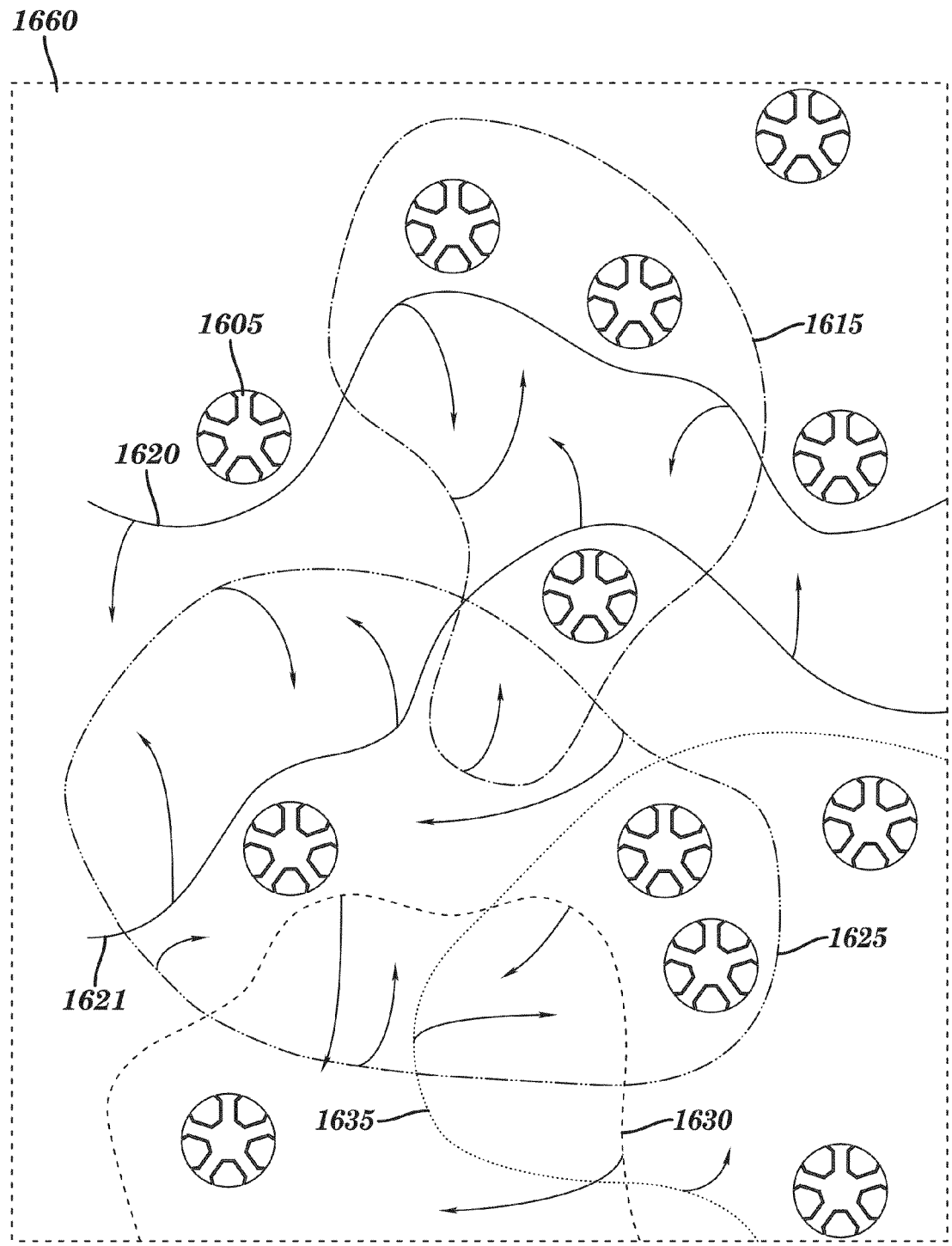
FIG. 6C is a diagram of a geographic area comprising 5 macro grids and 12 micro grid apparatuses and being later in time than the geographic area in FIG. 6B, in accordance with embodiments of the present invention.

FIG. 6C is a diagram of a geographic area 1660 comprising 5 macro grids and 12 micro grid apparatuses, in accordance with embodiments of the present invention. FIG. 6C depicts a distribution of micro grid apparatuses within the 5 macro grids. The 12 micro grid apparatuses in FIG. 6C are the same micro grid apparatuses as the 12 micro grid apparatuses in FIG. 6B. The geographical area 1660 of FIG. 6C is later in time than is the geographical area 1640 of FIG. 6B and either encompasses or is a subset of the geographical area 1640. Each micro grid apparatus in FIG. 6C comprises its micro grid system stack, as explained supra. Some or all of the 12 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6C is identified by the macro grid processor (1615, 1620, 1625, 1630, 1635) included in its respective macro grid. Each macro grid is governed by its own artificial intelligence. In one embodiment, the geographic area 1660 is one kilometer across. At least one micro grid apparatus (denoted by its micro grid system stack 1605) is not connected or participant to any of the macro grids. One of the macro grids (1620) has experienced a decaying artificial intelligence and is disappearing due to removal of all of its participating macro grid processors. The geographical footprints of the other macro grids are reducing in size as their alert scale value reduces. Directional arrows illustrate an instantaneous direction in which portions of each of geographical footprints is dynamically moving, which may represent an expansion or contraction of each macro grid. The distribution of micro grid apparatuses within the 5 macro grids of FIG. 6C have not changed from the distribution of micro grid apparatuses within the same 5 macro grids of FIG. 6C during the period of time from the time associated with FIG. 6B to the time associated with FIG. 6C.

Figure 6D:
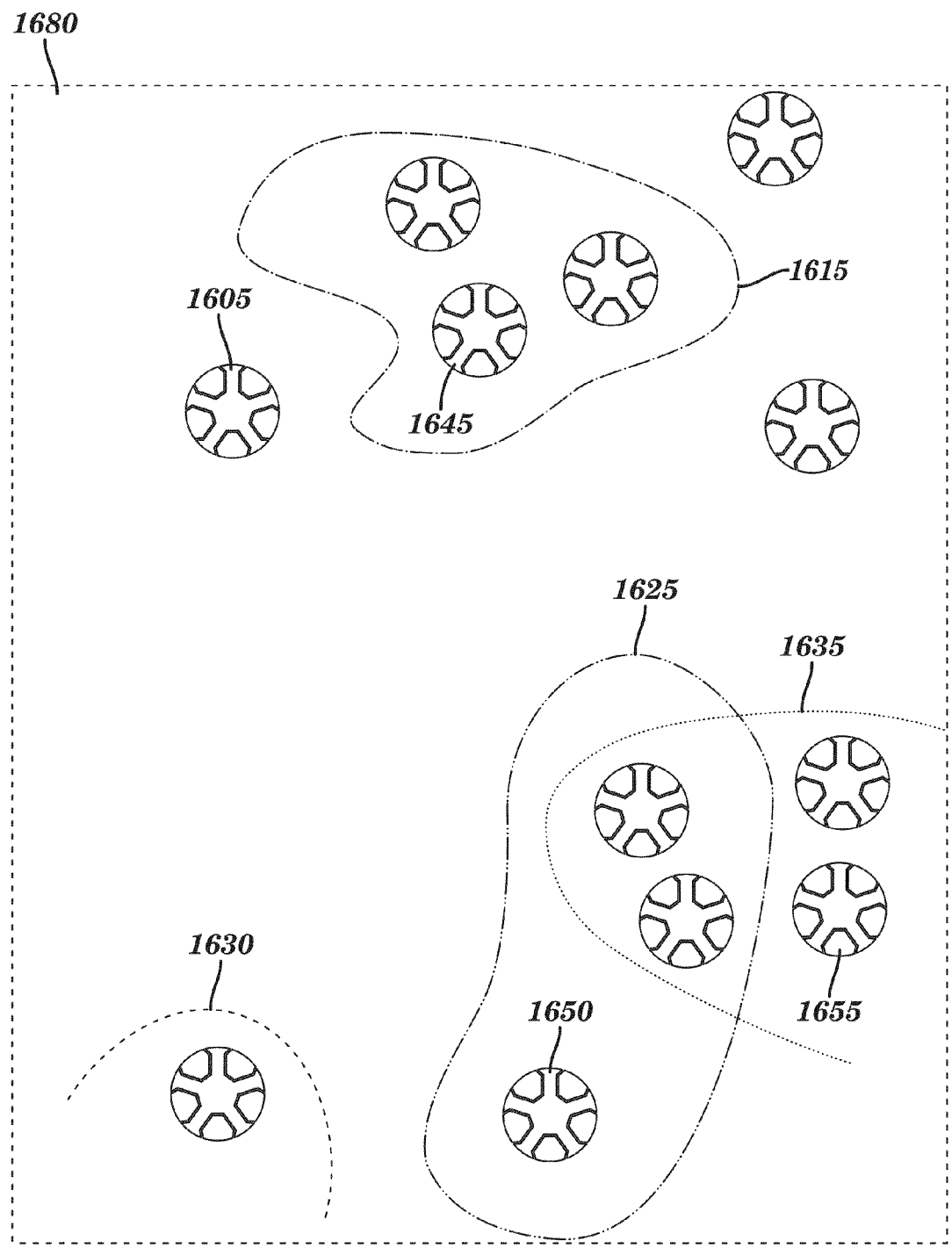
FIG. 6D is a diagram of a geographic area comprising 5 macro grids and 12 micro grid apparatuses and being later in time than the geographic area in FIG. 6C, in accordance with embodiments of the present invention.

FIG. 6D is a diagram of a geographic area 1680 comprising 5 macro grids and 12 micro grid apparatuses, in accordance with embodiments of the present invention. FIG. 6D depicts a distribution of micro grid apparatuses within the 5 macro grids. The geographical area 1680 of FIG. 6D is later in time than is the geographical area 1660 of FIG. 6C and either encompasses or is a subset of the geographical area 1660. The 5 macro grids in the geographic area 1680 in FIG. 6D are associated with a subset of the 12 micro grid apparatuses and consist of the 5 macro grids of FIG. 6C. Each micro grid apparatus in FIG. 6D comprises its micro grid system stack, as explained supra. Some or all of the 12 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6D is identified by the macro grid processor (1615, 1625, 1630, 1635) included in its respective macro grid. Each macro grid is governed by its own artificial intelligence. In one embodiment, the geographic area 1680 is one kilometer across. At least one micro grid apparatus (denoted by its micro grid system stack 1605) is not connected or participant to any of the macro grids. One of the macro grids (1620) has experienced a decaying artificial intelligence and is disappearing due to removal of all of its participating macro grid processors. At the time associated with FIG. 6D, the macro grid 1620 includes micro grid apparatuses only outside of geographical area 1680 and is therefore not explicitly identified in FIG. 6D. The geographical footprints of the other macro grids are reducing in size as their alert scale value reduces. Only 4 macro grids of the 5 macro grids in FIG. 6C remain in FIG. 6D and have been reduced in size and continue to be reduced in size as their alert scale values are being reduced, namely the 4 macro grids identified by the respective macro grid processors 1615, 1625, 1630, 1635. Three micro grid apparatuses (1645, 1650, 1655) are mobile (e.g., in vehicles) that do not appear in FIG. 3C, and their GPS systems indicate a change in 'location value' that is recognized by their governing artificial intelligences to maintain their wireless connections and macro grid participation. Similar to FIG. 6B, the distribution of micro grid apparatuses within the 5 macro grids of FIG. 6D differ from the distribution of micro grid apparatuses within the same 5 macro grids of FIG. 6A and include new micro grid apparatuses (e.g., 1645, 1650, 1655) due to the dynamic evolution and spatial migration of the 5 macro grids from the time associated with FIG. 6C to the time associated with FIG. 6D.

The expansion and contraction of artificial intelligence footprints is generally dynamic and changing.

Each macro grid in FIG. 5D, FIG. 6A, FIG. 6B, FIG. 6C, FIG. 6D, and/or any other macro grid described herein, is formed by the process depicted in FIG. 4C, FIG. 4D, FIG. E, or combinations thereof.

Figure 7A:
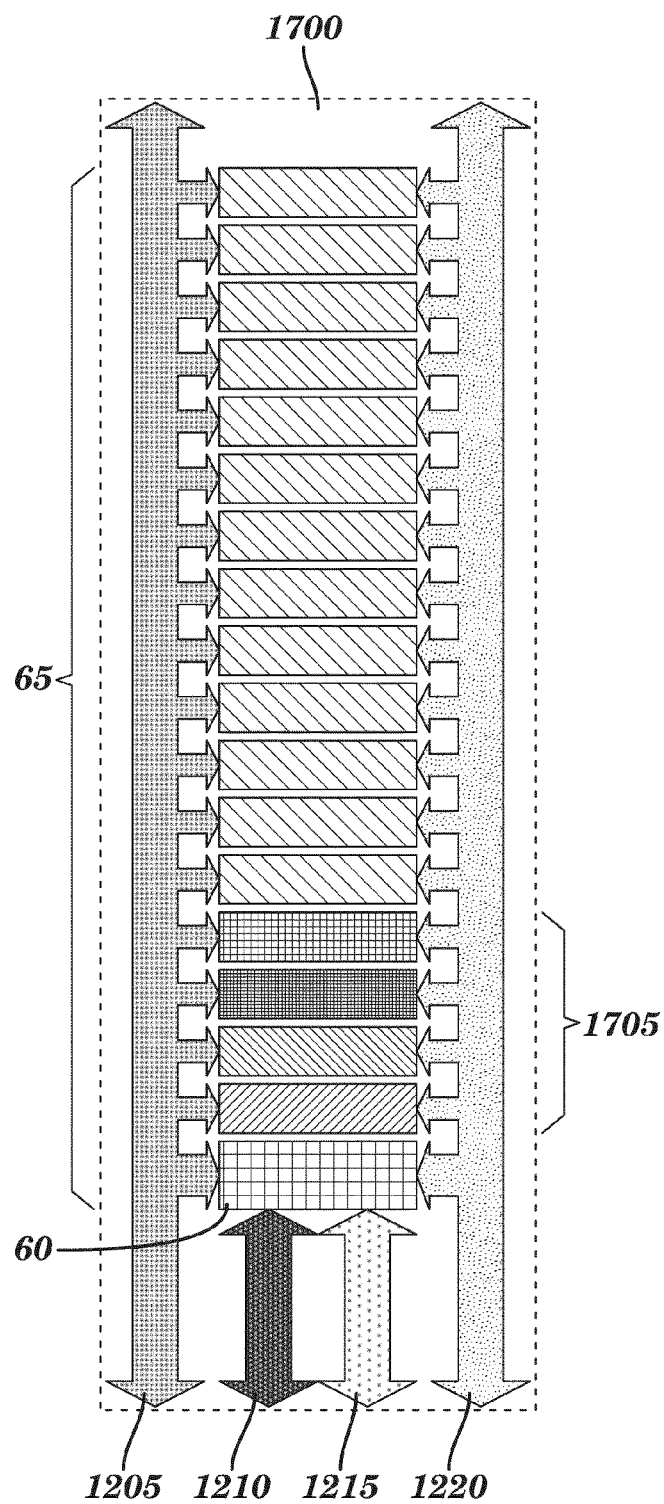
FIG. 7A depicts a micro grid system stack of 18 processors, in accordance with embodiments of the present invention.

FIG. 7A depicts a micro grid system stack 1700 of 18 processors, in accordance with embodiments of the present invention. The micro grid system stack 1700 comprises a unique micro grid processor 60, four designated macro grid processors (1705) of four corresponding macro grids, and 13 micro grid processors 65 (as additional processing resources, some or all of which may be allocated to the four designated macro grid processors (1705)). The four corresponding macro grids exist contemporaneously and have four corresponding artificial intelligences co-existing in the same micro grid apparatus (i.e., the same micro grid system stack 1700). Also shown are the buses (micro grid system bus 1205, standard system buses 1210 and 1215, macro grid system bus 1220) for data transfer and software connections. The unique micro grid processor 60 maintains an orderly macro stack of macro grid processors by selecting the next available micro grid processor in the linear micro grid stack for operating system change to a macro grid processor. A process of 'stack house keeping' by the unique processor 60 ensures stack efficiency and micro grid processor availability for assignment of micro grid processing resources 65 to alert requests.

Figure 7B:
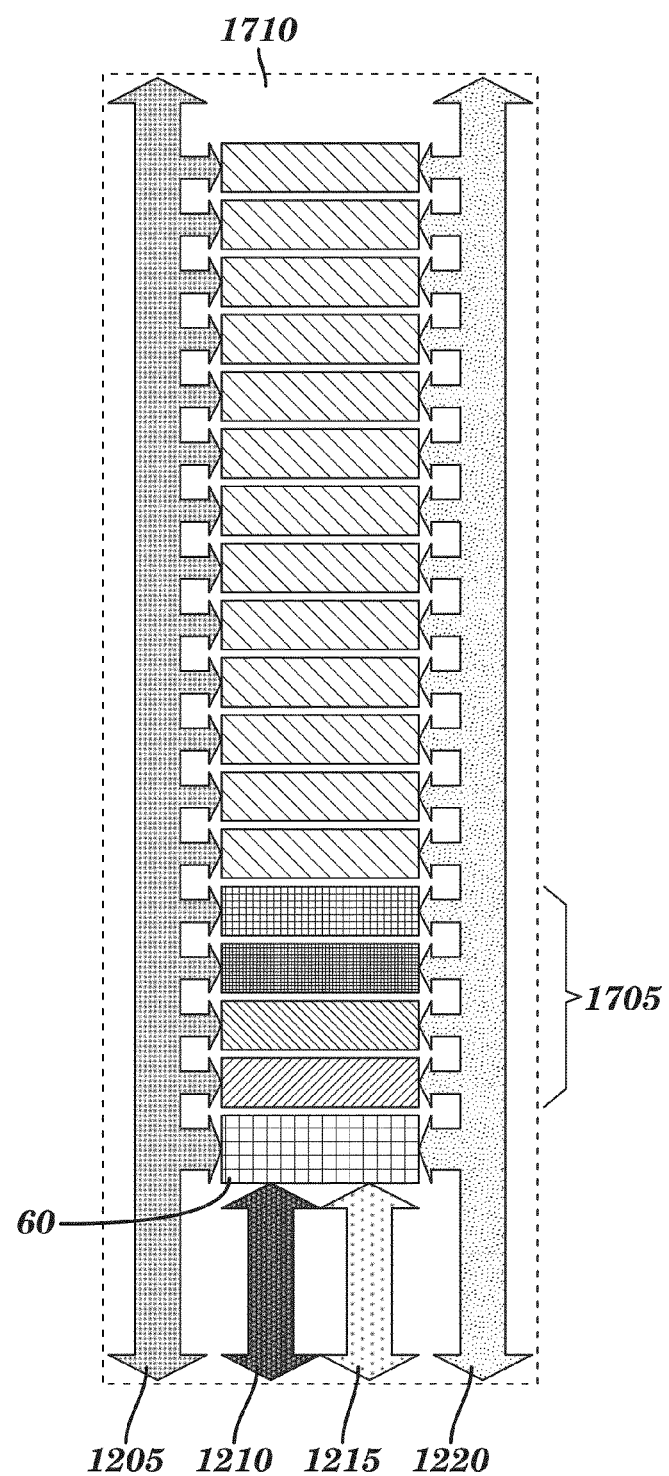
FIG. 7B is a diagram showing a micro grid system stack of 18 processors, displaying an extension capability of buses, in accordance with embodiments of the present invention.

FIG. 7B is a diagram showing a micro grid system stack 1710 of 18 processors, displaying the extension capability of the buses, in accordance with embodiments of the present invention. The micro grid system stack 1710 comprises a unique micro grid processor 60, four designated macro grid processors (1705) of four corresponding macro grids, and 13 micro grid processors 65 (as additional processing resources, some or all of which may be allocated to the four designated macro grid processors (1705)). The four corresponding macro grids exist contemporaneously and have four corresponding artificial intelligences co-existing in the same micro grid apparatus (i.e., the same micro grid system stack 1700). Also shown are the buses (micro grid system bus 1205, standard system buses 1210 and 1215, macro grid system bus 1220) for data transfer and software connections. The unique micro grid processor 60 is embodied at the base (in position zero) of the micro grid system stack 1710. The micro grid system bus 1205 and macro grid system bus 1220 can be extended to provide their bus functionality from 9 to 18 or more micro grid processors with their own individual operating systems. The combined standard system buses 1210 and 1215, micro grid system bus 1205 and macro grid system bus 1220 can be extended to a plurality of other micro grid processor stacks by an irregular shaped module or 'bridge', physically connecting other micro grid apparatuses together.

Figure 7C:
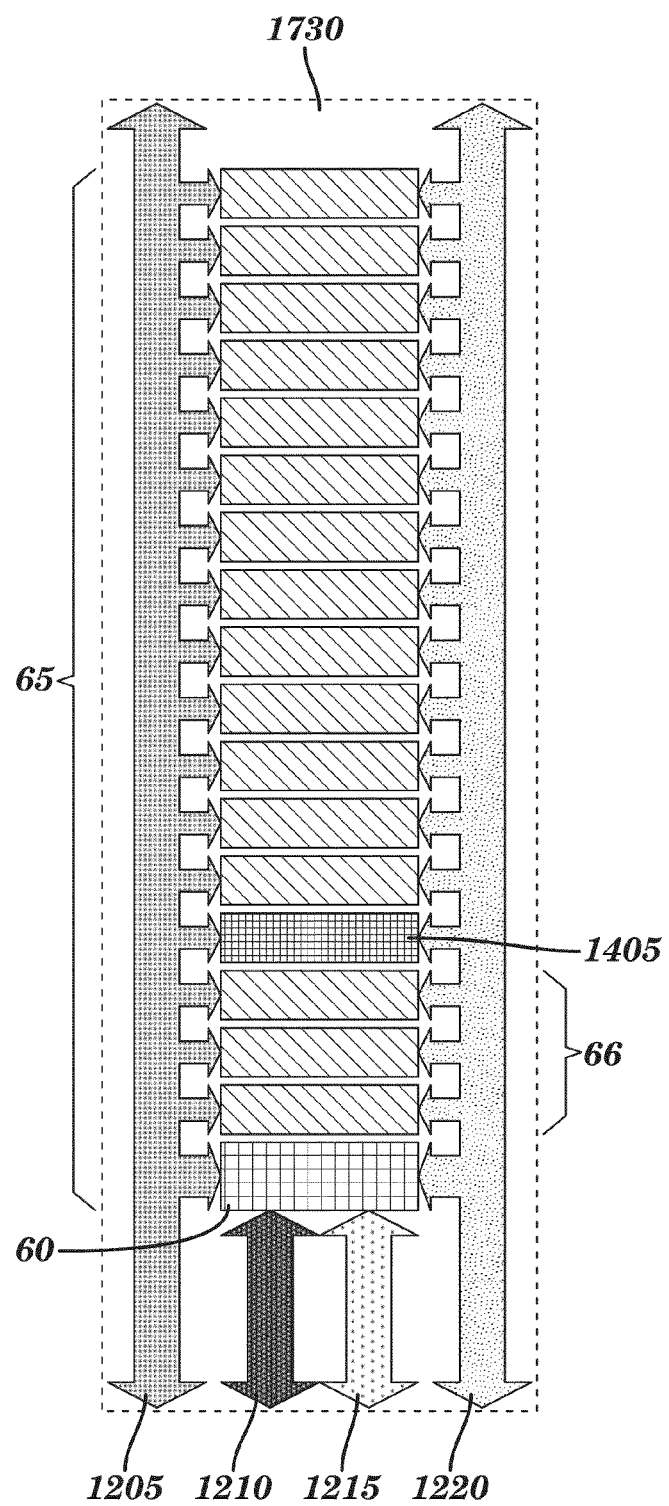
FIG. 7C is a diagram showing a micro grid system stack of 18 processors, displaying operating system change and re-assignment as artificial intelligence requirements of an apparatus are extinguished within a single apparatus, in accordance with embodiments of the present invention.

FIG. 7C is a diagram showing a micro grid system stack 1730 of 18 processors, displaying operating system change and re-assignment as artificial intelligence requirements of the apparatus are extinguished within a single apparatus, in accordance with embodiments of the present invention. The micro grid system stack 1730 comprises a unique micro grid processor 60, a designated macro grid processor 1405 of a corresponding macro grid, 3 micro grid processors 66, and 13 micro grid processors 65. Also shown are the buses (micro grid system bus 1205, standard system buses 1210 and 1215, macro grid system bus 1220) for data transfer and software connections. The unique processor 60 constantly monitors alert data via its attached local and remote sensors, as well as the alert data issued by the macro grid artificial intelligence it is participating in. The unique processor 60 constantly receives alert values of scale from a plurality of sources. The alert value of scale for the macro grid processor 1405 indicates it is still required to participate in providing processing resources for the artificial intelligence within that macro grid. However, the 3 macro grid processors 66 have been returned to micro grid operating systems as their artificial intelligences have been extinguished. The next step is for the unique processor 60 in the micro grid system stack to apply further 'housekeeping' and relocate the operating system of the macro grid processor 1405 at stack position four to stack position one. The three freshly re-assigned micro grid processors 66 are then coalesced with the other 13 micro grid processors 65 by the unique processor 60's instruction, resulting in a linear and uninterrupted stack of 16 micro grid processors (not shown), ready for the next alert.

The scale (S) of an alert is computed by the artificial intelligence from alert data either detected directly via the unique processor 60 within the structure 500 (see FIG. 4B) from the connected local sensors and/or remote sensors via the micro grid's I/O module 410 and communications module 425 (see FIG. 4B), or received (see step 1455 of FIG. 4D) from an external micro grid apparatus or a macro grid that is wirelessly connected to the micro grid apparatus 100.

Adjacent wirelessly connectable physical apparatuses respond to the received (1450 to 1470) alert and join the macro grid along with processing resources as required by the artificial intelligence. The communicational data may be in the TCP/IP packet format.

The scale (S) of an alert is computed and used by the artificial intelligence to constantly indicate an alert value to all participating wirelessly connected micro grid unique processors (60) responsible for assigning macro grid processors and managing micro grid processors and resources. The scale (S) indicates, to the unique processor 60, a requirement to conscript more micro grid processors for the artificial intelligence, maintain the status quo, or reduce resource participation, which facilitates scalability of the dynamic functional use of the micro grid systems.

The artificial intelligence processes the data to counter the event with physical action and activity against the cause of the alert. This is undertaken by instruction to the available intelligent actuators (not shown) controlled by the unique operating system of the unique processor 60 in each micro grid apparatus. Alert queries provides the necessary feedback to the artificial intelligence to assess the effectiveness of the counter, which is then adjusted accordingly. This counter action and feedback mechanism may occur within a short period (e.g., milliseconds).

There are many examples for using the present invention, wherein micro grid and macro grid alert processing can be provided for artificial intelligence to take pro-active control of situations, initiated by the raising of alarms and alerts. Micro grid and macro grid technology could be deployed everywhere, resolving issues, counteracting events, and controlling remote circumstances that would otherwise require centralized decision making by people, who are not always available 24×7×365.

The following three hypothetical examples illustrate use of the present invention.

1. A huge forest fire erupts overnight in the hills behind Los Angeles (LA). The wind direction and fire intensity indicates an event to some outer LA suburbs within 48 hours. 427 fire trucks and 3 sky-crane helicopters have been dispatched by the greater LA Fire Authority into the area. Micro grids are embedded in all vehicles, and monitor heat, wind, smoke, and location information from their intelligent sensors. A smoke alert is raised by one of the micro grids. Quickly a macro grid is formed between all vehicles and the artificial intelligence takes control of the dangerous event. Each vehicle has interactive voice and video. The artificial intelligence interfaces with these communication devices and issues task assignments to the LA Fire Authority Units. The artificial intelligence provides a constant stream of updated information to central control, police, ambulance, and news media. The forest fire is surrounded by fire fighting efficiency and resource co-ordination. Within 36 hour, the potential disaster is arrested and suffocated. The wireless macro grid decays and separates back to individual micro grid processing. The mayor thanks the LA Fire Authority for another job well done.

2. It is year 2017 and the recently arrived NASA roving vehicles on Titan have been transmitting astounding images and data to Earth central control. A micro meteorite impacts 200 meters from one of the rovers, creating a sudden geological landscape change, unseen by earth controllers that may prove destructive for the $4 billion mission. Large freshly formed terrain fractures are detected by micro grid sensors on the rovers. A macro grid is quickly formed, and the generated artificial intelligence overrides current forward movement instructions and stops the affected rover immediately. This averts a potential rover loss, as communication with earth control is over 16 minutes (turnaround). The artificial intelligence re-evaluates the terrain and provides Earth controllers with Titan ground distance images and new atmospheric temperature, dust, gas and pressure data from the direction of the meteorite impact. The artificial intelligence decays and the individual micro grid unique processor in the command vehicle waits revised mission instructions.

3. It is 6.30 AM on a winter day in year 2012, and 400,000 vehicles are on the M1 motorway in England due to people traveling to work. Micro grid computing has been embedded in vehicles since year 2009 and approximately 15% of the vehicles have the technology. A thick fog rolls in over a 12 mile portion of the M1 motorway. Micro-grid sensors within the vehicles react to the arrival of the thick fog and indicate the density and GPS location to the other collaborating macro grid connected vehicles. Quickly, a fog pattern alert is generated by the artificial intelligence and conveyed to British motorway authorities including weather forecasters, television stations, and radio stations. The collaborating processors in the macro grid dispatch and share an unsolicited alert image on their dashboard LCD screens indicating topographic size and density of the fog. Safely, the vehicles slow down influencing other non-macro-grid vehicle drivers to do the same. Image processing, sensor sampling, and information up-dates are maintained by the artificial intelligence until all vehicles have passed through the fog, and the fog itself lifts for another fine day.

FIG. 8 illustrates an exemplary data processing apparatus 90 used for implementing any process or functionality of any processor used in accordance with embodiments of the present invention. The data processing apparatus 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for implementing any process or functionality of any processor used in accordance with embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Any of the components of the present invention could be created, integrated, hosted, maintained, deployed, managed, serviced, supported, etc. by a service provider who offers to facilitate implementation of any process or functionality of any processor used in accordance with embodiments of the present invention. Thus the present invention discloses a process for deploying or integrating computing infrastructure, comprising integrating computer-readable code into the data processing apparatus 90. Therefore, the code in combination with the data processing apparatus 90 is capable of performing any process or functionality of any processor used in accordance with embodiments of the present invention.

In another embodiment, the invention provides a method that performs the process steps of the invention on a subscription, advertising, and/or fee basis. That is, a service provider, such as a Solution Integrator, could offer to facilitate implementation of any process or functionality of any processor used in accordance with embodiments of the present invention. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows only one processor 91, the processor 91 may represent an array of processors such as the plurality of processors 65 coupled to the input device 92, the output device 93, and the memory devices 94 and 95.

While FIG. 8 shows the data processing apparatus 90 as a particular configuration of hardware and software, any configuration of hardware and software, as would be known to a person of ordinary skill in the art, may be utilized for the purposes stated supra in conjunction with the particular data processing apparatus 90 of FIG. 8. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for responding to an alert pertaining to an event, said method comprising:
- a unique processor of a first micro grid apparatus of at least one micro grid apparatus detecting an alert data packet comprising the alert, each micro grid apparatus comprising a plurality of processors that include a unique processor, each processor of each micro grid apparatus having its own operating system, the unique processor of each micro grid apparatus having a unique operating system that differs from the operating system of each other processor of each micro grid apparatus;
- after said detecting the alert data packet, each unique processor selecting at least one processor from each micro grid apparatus;
- designating each selected processor as a macro grid processor of a respective macro grid by altering the operating system of each selected processor to be a macro grid operating system and by assigning to each selected processor a responsibility for operation of its respective macro grid;
- generating an artificial intelligence for each macro grid;
- responding to and quenching the event by implementing the artificial intelligence of each macro grid; and
- after said quenching the event, extinguishing each macro grid.

2. The method of claim 1, wherein the at least one micro grid apparatus comprises a plurality of micro grid apparatuses, wherein said designating results in the respective macro grids comprising a plurality of macro grids, and wherein said implementing the artificial intelligence of each macro grid comprises contemporaneously implementing the artificial intelligence of each macro grid to perform said responding to and quenching the event.

3. The method of claim 2, wherein the method further comprises:
- for each macro grid, assigning one or more processors in each micro grid apparatus, other than the selected processors in each micro grid apparatus, as computational resources for each macro grid.

4. The method of claim 2, wherein at least two macro grids of the plurality of macro grids include a different macro grid processor selected from a same micro grid apparatus.

5. The method of claim 2, wherein the method further comprises geographically relocating at least one macro grid processor of a first macro grid of the plurality of macro grids, which results in the first macro grid having its geographical footprint increased or decreased.

6. The method of claim 2, wherein the alert data packet includes an identification of a scale (S), wherein the scale S is a function of a magnitude of the event (E), an urgency level for responding to the event (U), and a quash time for extinguishing the event (Q), and wherein the method further comprises:
- determining, based on the scale identified in the alert data packet, a total number of processors of the at least one processor to be selected from each micro grid apparatus during said selecting.

7. The method of claim 6, wherein the method further comprises:
- the artificial intelligence for a first macro grid of the plurality of macro grids ascertaining that the scale is increased relative to the scale identified in the alert data packet; and
- responsive to said ascertaining, adding at least one macro grid processor to the first macro grid, which results in the first macro grid having its geographical footprint increased.

8. The method of claim 6, wherein the method further comprises:
- the artificial intelligence for a first macro grid of the plurality of macro grids ascertaining that the scale is decreased relative to the scale identified in the alert data packet; and
- responsive to said ascertaining, removing at least one macro grid processor from the first macro grid, which results in the first macro grid having its geographical footprint decreased.

9. The method of claim 6, wherein $S=(E \times U)/Q$.

10. A system for responding to an alert pertaining to an event, said system comprising:
- at least one micro grid apparatus, each micro grid apparatus comprising a plurality of processors that include a unique processor, each processor of each micro grid apparatus having its own operating system, the unique processor of each micro grid apparatus having a unique operating system that differs from the operating system of each other processor of each micro grid apparatus, said at least one micro grid apparatus configured to perform a method, said method comprising:
  - a unique processor of a first micro grid apparatus of the at least one micro grid apparatus detecting an alert data packet comprising the alert;
  - after said detecting the alert data packet, each unique processor selecting at least one processor from each micro grid apparatus;
  - designating each selected processor as a macro grid processor of a respective macro grid by altering the operating system of each selected processor to be a macro grid operating system and by assigning to each selected processor a responsibility for operation of its respective macro grid;
  - generating an artificial intelligence for each macro grid;
  - responding to and quenching the event by implementing the artificial intelligence of each macro grid; and
  - after said quenching the event, extinguishing each macro grid.

11. The system of claim 10, wherein the at least one micro grid apparatus comprises a plurality of micro grid apparatuses, wherein said designating results in the respective macro grids comprising a plurality of macro grids, and wherein said implementing the artificial intelligence of each macro grid comprises contemporaneously implementing the artificial intelligence of each macro grid to perform said responding to and quenching the event.

12. The system of claim 11, wherein the method further comprises:
- for each macro grid, assigning one or more processors in each micro grid apparatus, other than the selected processors in each micro grid apparatus, as computational resources for each macro grid.

13. The system of claim 11, wherein at least two macro grids of the plurality of macro grids include a different macro grid processor selected from a same micro grid apparatus.

14. The system of claim 11, wherein the method further comprises geographically relocating at least one macro grid processor of a first macro grid of the plurality of macro grids, which results in the first macro grid having its geographical footprint increased or decreased.

15. The system of claim 11, wherein the alert data packet includes an identification of a scale (S), wherein the scale S is a function of a magnitude of the event (E), an urgency level for responding to the event (U), and a quash time for extinguishing the event (Q), and wherein the method further comprises:

determining, based on the scale identified in the alert data packet, a total number of processors of the at least one processor to be selected from each micro grid apparatus during said selecting.

16. The system of claim 15, wherein the method further comprises:
    the artificial intelligence for a first macro grid of the plurality of macro grids ascertaining that the scale is increased relative to the scale identified in the alert data packet; and
    responsive to said ascertaining, adding at least one macro grid processor to the first macro grid, which results in the first macro grid having its geographical footprint increased.

17. The system of claim 15, wherein the method further comprises:
    the artificial intelligence for a first macro grid of the plurality of macro grids ascertaining that the scale is decreased relative to the scale identified in the alert data packet; and
    responsive to said ascertaining, removing at least one macro grid processor from the first macro grid, which results in the first macro grid having its geographical footprint decreased.

18. A process for supporting computer infrastructure, said process comprising providing at least one support service for creating, integrating, hosting, maintaining, and/or deploying computer-readable code in a data processing system, wherein the code in combination with the data processing system is configured to perform a method for responding to an alert pertaining to an event, said method comprising:
    a unique processor of a first micro grid apparatus of at least one micro grid apparatus detecting an alert data packet comprising the alert, each micro grid apparatus comprising a plurality of processors that include a unique processor, each processor of each micro grid apparatus having its own operating system, the unique processor of each micro grid apparatus having a unique operating system that differs from the operating system of each other processor of each micro grid apparatus;
    after said detecting the alert data packet, each unique processor selecting at least one processor from each micro grid apparatus;
    designating each selected processor as a macro grid processor of a respective macro grid by altering the operating system of each selected processor to be a macro grid operating system and by assigning to each selected processor a responsibility for operation of its respective macro grid;
    generating an artificial intelligence for each macro grid;
    responding to and quenching the event by implementing the artificial intelligence of each macro grid; and
    after said quenching the event, extinguishing each macro grid.

19. The process of claim 18, wherein the at least one micro grid apparatus comprises a plurality of micro grid apparatuses, wherein said designating results in the respective macro grids comprising a plurality of macro grids, and wherein said implementing the artificial intelligence of each macro grid comprises contemporaneously implementing the artificial intelligence of each macro grid to perform said responding to and quenching the event.

20. The process of claim 19, wherein the method further comprises:
    for each macro grid, assigning one or more processors in each micro grid apparatus, other than the selected processors in each micro grid apparatus, as computational resources for each macro grid.

21. The process of claim 19, wherein at least two macro grids of the plurality of macro grids include a different macro grid processor selected from a same micro grid apparatus.

22. The process of claim 19, wherein the method further comprises geographically relocating at least one macro grid processor of a first macro grid of the plurality of macro grids, which results in the first macro grid having its geographical footprint increased or decreased.

23. The process of claim 19, wherein the alert data packet includes an identification of a scale (S), wherein the scale S is a function of a magnitude of the event (E), an urgency level for responding to the event (U), and a quash time for extinguishing the event (Q), and wherein the method further comprises:
    determining, based on the scale identified in the alert data packet, a total number of processors of the at least one processor to be selected from each micro grid apparatus during said selecting.

24. The process of claim 23, wherein the method further comprises:
    the artificial intelligence for a first macro grid of the plurality of macro grids ascertaining that the scale is increased relative to the scale identified in the alert data packet; and
    responsive to said ascertaining, adding at least one macro grid processor to the first macro grid, which results in the first macro grid having its geographical footprint increased.

25. The process of claim 23, wherein the method further comprises:
    the artificial intelligence for a first macro grid of the plurality of macro grids ascertaining that the scale is decreased relative to the scale identified in the alert data packet; and
    responsive to said ascertaining, removing at least one macro grid processor from the first macro grid, which results in the first macro grid having its geographical footprint decreased.

* * * * *